(12) United States Patent
Crudden et al.

(10) Patent No.: US 12,258,655 B2
(45) Date of Patent: Mar. 25, 2025

(54) NICKEL-BASED ALLOY

(71) Applicant: ALLOYED LIMITED, Kidlington (GB)

(72) Inventors: David Crudden, Begbroke (GB); Andre Nemeth, Begbroke (GB)

(73) Assignee: ALLOYED LIMITED, Kidlington (GB)

( * ) Notice: Subject to any disclaimer, the term of this patent is extended or adjusted under 35 U.S.C. 154(b) by 0 days.

(21) Appl. No.: 18/117,828

(22) Filed: Mar. 6, 2023

(65) Prior Publication Data

US 2023/0220519 A1 Jul. 13, 2023

Related U.S. Application Data

(63) Continuation of application No. 16/634,406, filed as application No. PCT/GB2018/052124 on Jul. 27, 2018, now Pat. No. 11,634,792.

(30) Foreign Application Priority Data

Jul. 28, 2017 (GB) ..................................... 1712196

(51) Int. Cl.
*C22C 19/05* (2006.01)
*B33Y 70/00* (2020.01)

(52) U.S. Cl.
CPC ............ *C22C 19/056* (2013.01); *B33Y 70/00* (2014.12)

(58) Field of Classification Search
None
See application file for complete search history.

(56) References Cited

U.S. PATENT DOCUMENTS 3,941,590 A 3/1976 Watanabe
5,130,089 A 7/1992 Henry
(Continued)

FOREIGN PATENT DOCUMENTS

DE 102015016729 6/2017
EP 0403682 12/1990
(Continued)

OTHER PUBLICATIONS

El-Bagoury et al., "Effect of various heat treatment conditions on microstructure of cast polycrystalline IN738LC alloy" *Materials Science and Engineering* A 2008, 487(1-2), 152-161.
(Continued)

*Primary Examiner* — Seth Dumbris
(74) *Attorney, Agent, or Firm* — NORTON ROSE FULBRIGHT US LLP

(57) ABSTRACT

A nickel-based alloy composition consisting, in weight percent, of: between 1.0 and 3.5% aluminium, 0.0 and 3.6% titanium, 0.0 and 6.0% niobium, 0.0 and 4.9% tantalum, 0.0 and 5.4% tungsten, 0.0 and 4.0% molybdenum, 8.9 and 30.0% cobalt, 10.8 and 20.6% chromium, 0.02 and 0.35% carbon, between 0.001 and 0.2% boron, between 0.001 and 0.5% zirconium, 0.0 and 5.0% rhenium, 0.0 and 8.5% ruthenium, 0.0 and 4.6 percent iridium, between 0.0 and 0.5% vanadium, between 0.0 and 1.0% palladium, between 0.0 and 1.0% platinum, between 0.0 and 0.5% silicon, between 0.0 and 0.1% yttrium, between 0.0 and 0.1% lanthanum, between 0.0 and 0.1% cerium, between 0.0 and 0.003% sulphur, between 0.0 and 0.25% manganese, between 0.0 and 6.0% iron, between 0.0 and 0.5% copper, between 0.0 and 0.5% hafnium, the balance being nickel and incidental impurities, wherein the following equations are satisfied in which $W_{Nb}$, $W_{Ta}$, $W_{Ti}$, $W_{Mo}$, $W_{Al}$, $W_{Re}$ and $W_{Ru}$ are the weight percent of niobium, tantalum, titanium, molybdenum, aluminium, rhenium and ruthenium in the alloy respectively (Continued)

$$4.2 \leq (W_W + 0.92 W_{Re} + 1.58 W_{Ru}) + W_{Mo}$$

$$W_{Al} + 0.5 W_{Ti} + 0.3 W_{Nb} + 0.15 W_{Ta} \leq 4.0$$

and $$3.0 \leq W_{Al} + 0.5 W_{Ti} + 1.5 (0.3 W_{Nb} + 0.15 W_{Ta}).$$

19 Claims, 14 Drawing Sheets

(56) References Cited

U.S. PATENT DOCUMENTS

| | | | |
|---|---|---|---|
| 5,476,555 | A | 12/1995 | Erickson |
| 5,882,586 | A | 3/1999 | Tamura et al. |
| 6,051,083 | A | 4/2000 | Tamaki et al. |
| 6,177,046 | B1 * | 1/2001 | Simkovich ............ C22C 19/056 148/427 |
| 6,284,392 | B1 | 9/2001 | Seth et al. |
| 6,478,897 | B1 | 11/2002 | Izumida et al. |
| 6,706,241 | B1 | 3/2004 | Baumann et al. |
| 6,908,519 | B2 | 6/2005 | Raymond et al. |
| 7,014,723 | B2 | 3/2006 | Beck et al. |
| 7,854,809 | B2 | 12/2010 | Arrell et al. |
| 9,243,514 | B2 | 1/2016 | Krotzer, Jr. et al. |
| 9,352,421 | B2 | 5/2016 | Illston |
| 9,670,572 | B2 | 6/2017 | Etter et al. |
| 11,180,840 | B2 | 11/2021 | Goncharov et al. |
| 11,459,640 | B2 | 10/2022 | Goncharov et al. |
| 11,634,792 | B2 | 4/2023 | Crudden et al. |
| 2004/0022661 | A1 | 2/2004 | Wood et al. |
| 2004/0177901 | A1 | 9/2004 | Yoshinari et al. |
| 2006/0039817 | A1 | 2/2006 | Kelly |
| 2007/0051199 | A1 | 3/2007 | Etuve et al. |
| 2007/0095441 | A1 | 5/2007 | Jiang et al. |
| 2008/0166258 | A1 | 7/2008 | Tanimoto et al. |
| 2010/0059146 | A1 | 3/2010 | Sato et al. |
| 2010/0296962 | A1 | 11/2010 | Hasselqvist et al. |
| 2010/0329876 | A1 | 12/2010 | Bain et al. |
| 2012/0251307 | A1 | 10/2012 | Nishimoto et al. |
| 2012/0288400 | A1 | 11/2012 | Hirata et al. |
| 2013/0323069 | A1 | 12/2013 | Izumi et al. |
| 2014/0017511 | A1 | 1/2014 | Izumi et al. |
| 2014/0234155 | A1 | 8/2014 | Semba et al. |
| 2015/0197833 | A1 | 7/2015 | Kawagishi |
| 2015/0322557 | A1 | 11/2015 | Etter et al. |
| 2015/0368774 | A1 | 12/2015 | Ota et al. |
| 2016/0002752 | A1 | 1/2016 | Srivastava et al. |
| 2016/0167172 | A1 | 6/2016 | Goncharov et al. |
| 2016/0222490 | A1 | 8/2016 | Wright et al. |
| 2017/0021453 | A1 | 1/2017 | Engeli et al. |
| 2017/0088919 | A1 * | 3/2017 | Hardy .................. C22C 19/056 |
| 2017/0189960 | A1 | 7/2017 | Ibe |
| 2017/0216919 | A1 | 8/2017 | Liu et al. |
| 2017/0342525 | A1 | 11/2017 | Takasawa et al. |
| 2018/0002793 | A1 | 1/2018 | Detor et al. |
| 2018/0002794 | A1 | 1/2018 | Detor et al. |
| 2018/0023176 | A1 | 1/2018 | Han et al. |
| 2018/0057921 | A1 | 3/2018 | Kobayashi et al. |
| 2018/0100223 | A1 | 4/2018 | Kobayashi et al. |
| 2019/0360078 | A1 | 11/2019 | Hardy et al. |

FOREIGN PATENT DOCUMENTS

| | | |
|---|---|---|
| EP | 0709477 | 5/1996 |
| EP | 0789087 | 8/1997 |
| EP | 1096033 | 5/2001 |
| EP | 1193321 | 4/2002 |
| EP | 1195446 | 4/2002 |
| EP | 1410872 | 4/2004 |
| EP | 1502966 | 2/2005 |
| EP | 1674596 | 6/2006 |
| EP | 1790750 | 5/2007 |
| EP | 1813690 | 8/2007 |
| EP | 1847627 | 10/2007 |
| EP | 1997921 | 12/2008 |
| EP | 2071128 | 6/2009 |
| EP | 2246449 | 11/2010 |
| EP | 2256222 | 12/2010 |
| EP | 2298946 | 3/2011 |
| EP | 2327493 | 6/2011 |
| EP | 2412833 | 2/2012 |
| EP | 2530181 | 12/2012 |
| EP | 2772329 | 9/2014 |
| EP | 2826877 | 1/2015 |
| EP | 2894234 | 7/2015 |
| EP | 3091096 | 11/2016 |
| EP | 3153271 | 4/2017 |
| EP | 3159425 | 4/2017 |
| EP | 3170609 | 5/2017 |
| EP | 3202931 | 8/2017 |
| EP | 3208354 | 8/2017 |
| EP | 3208355 | 8/2017 |
| EP | 3249063 | 11/2017 |
| EP | 3257956 | 12/2017 |
| EP | 3278901 | 2/2018 |
| EP | 3327157 | 5/2018 |
| EP | 3327158 | 5/2018 |
| EP | 3336210 | 6/2018 |
| EP | 3693105 | 8/2020 |
| FR | 3013060 | 5/2015 |
| GB | 1243155 | 8/1971 |
| JP | H09272933 | 10/1997 |
| JP | H11310839 | 11/1999 |
| JP | 2003/113434 | 4/2003 |
| JP | 2004/256840 | 9/2004 |
| JP | 2008/045176 | 2/2008 |
| JP | 2009/013450 | 1/2009 |
| JP | 2009114501 | 5/2009 |
| JP | 2009/144203 | 7/2009 |
| JP | 2009/167499 | 7/2009 |
| JP | 2012/219339 | 11/2012 |
| JP | 2013/049902 | 3/2013 |
| JP | 2013/095949 | 5/2013 |
| JP | 2013216939 | 10/2013 |
| JP | 2014/122385 | 7/2014 |
| JP | 2014/210280 | 11/2014 |
| JP | 2015/117413 | 6/2015 |
| JP | 2016/000414 | 1/2016 |
| JP | 2016/037664 | 3/2016 |
| JP | 2016/056436 | 4/2016 |
| JP | 2016/196685 | 11/2016 |
| JP | 2017/179592 | 10/2017 |
| JP | 2018/123359 | 8/2018 |
| JP | 2018/145456 | 9/2018 |
| JP | 2018168400 | 11/2018 |
| KR | 10-20170058065 | 5/2017 |
| SE | 328414 | 9/1970 |
| WO | WO 2004/065645 | 8/2004 |
| WO | WO 2011/054864 | 5/2011 |
| WO | WO 2011/062231 | 5/2011 |
| WO | WO 2013/101692 | 7/2013 |
| WO | WO 2014/025432 | 2/2014 |
| WO | WO 2014/124626 | 8/2014 |
| WO | WO 2014/126086 | 8/2014 |
| WO | WO 2014/150323 | 9/2014 |
| WO | WO 2014/165073 | 10/2014 |
| WO | WO 2015/096980 | 7/2015 |
| WO | WO 2016/158705 | 10/2016 |
| WO | WO 2016/209591 | 12/2016 |
| WO | WO 2017/100169 | 6/2017 |
| WO | WO 2018/036797 | 3/2018 |
| WO | WO 2018/071328 | 4/2018 |
| WO | WO 2018/092204 | 5/2018 |
| WO | WO 2018/151222 | 8/2018 |
| WO | WO 2018/151262 | 8/2018 |
| WO | WO 2018/155446 | 8/2018 |
| WO | WO 2018/181098 | 10/2018 |
| WO | WO 2018/216067 | 11/2018 |
| WO | WO 2019/004176 | 1/2019 |

(56) References Cited

FOREIGN PATENT DOCUMENTS

| WO | WO 2019/021015 | 1/2019 |
|----|----------------|--------|
| WO | WO 2020/115478 | 6/2020 |
| WO | WO 2020/245575 | 12/2020 |

OTHER PUBLICATIONS

Ghoussoub et al., "On the Influence of Alloy Chemistry and Processing Conditions on Additive Manufacturability of Ni-Based Superalloys" *Superalloys* 2020, The Minerals, Metals & Materials Series, 153-162.
International Search Report and Written Opinion Issued in Corresponding PCT Patent Application No. PCT/GB2018/052124, mailed Nov. 7, 2018.
International Search Report and Written Opinion Issued in Corresponding PCT Patent Application No. PCT/GB2020/052349, dated Nov. 3, 2020.
International Search Report issued in the priority International Application No. PCT/GB2020/051330, dated Aug. 13, 2020.
Office Action issued in corresponding Japanese Application No. 2020-526700, dated Jul. 28, 2022 (English Machine Translation).
Search Report Issued in Corresponding United Kingdom Patent Application No. GB1712196.3, dated Feb. 20, 2018.
Tang et al., "The Effect of Heat Treatment on Tensile Yielding Response of the New Superalloy ABD-900AM for Additive Manufacturing" *Superalloys* 2020, The Minerals, Metals & Materials Series, 1055-1065.
Cruchley et al., "Chomia layer growth on a Ni-based superalloy: Sub-parabolic kinetics and the role of titanium", *Corrosion Science*, 2013.
Crudden, D.J. et al., "Modelling of influence of alloy composition on flow stress in high-strength nickel-based superalloys", *Acta Materialia*, 75, pp. 356-370, 2014.
Prager et al., Welding Research Council Bulletin, pp. 128, 1968.
Office Action issued in corresponding Japanese Application No. 2021-572300, dated Apr. 23, 2024 (English Translation provided).
Office Action issued in related U.S. Appl. No. 17/766,145, dated Apr. 23, 2024.
Office Communication issued in U.S. Appl. No. 17/766,145, dated Jul. 25, 2024.
Office Action issued in Corresponding Japanese Application No. 2022-520380, dated Nov. 26, 2024 (English Translation provided).

\* cited by examiner

NICKEL-BASED ALLOY

CROSS-REFERENCE TO RELATED APPLICATIONS

This application is a continuation of U.S. application Ser. No. 16/634,406 filed Jan. 27, 2020, which is a national phase under 35 U.S.C. § 371 of International Application No. PCT/GB2018/052124 filed Jul. 27, 2018, which claims the benefit of priority to UK Application No. 1712196.3 filed Jul. 28, 2017, the entire contents of each of which are hereby incorporated by reference in their entirety.

BACKGROUND

The present invention relates to a nickel-based superalloy composition designed for application in additive manufacturing (AM) processes, examples of such processes including but not limited to, powder-bed based AM methods (e.g. selective laser melting, electron beam melting), direct metal deposition methods (e.g. powder deposition and wire based methods). Metal AM is emerging as a new method of manufacture which can yield many benefits, such as increased component complexity, just-in-time manufacture and reduced material wastage. However, as the processing technology has matured there has been a limited focus on the development of new metal alloys designed to overcome one of the most significant limitations of the process, specifically combining ease of processing with high performance material properties. Currently, there has been a tendency to migrate nickel-based superalloys which have been successfully manufactured in cast form or wrought form to the AM process. However, this has proven largely inappropriate because many of the material characteristic required for ease of processing in the AM process are not fulfilled by such alloys leading to substantial difficulties in processing and resulting in materials which do not have the expected structural integrity.

Examples of a number of compositions of nickel-based superalloys which are widely applied in commercial application are listed in Table 1.

These materials are used to produce corrosion resistant components which retain high strength at elevated temperatures for a number of industries including: aerospace, power generation, chemical processing and oil & gas industries. They contain as many as ten different alloying elements, necessary to confer the desired combination of properties. However, for many of these alloys the combination of elements applied limits the ability of the material to be processed via AM. For others achievable strength is limited. Isolation of alloys with an improved combination of strength and ability to be processed by AM is desirable. Moreover, managing trade-offs in other properties, for example, creep resistance, density, cost, corrosion resistance is also desirable.

SUMMARY OF THE INVENTION

It is an aim of the invention to provide a nickel-based alloy suited for the production of high strength, corrosion resistance engineering artefacts via AM processes, in particular for applications where high temperature strength (tensile strength, creep strength) beyond 650° C. is required, this is combined with an excellent balance of material in cost and density.

In a first aspect the present invention provides a nickel-based alloy composition consisting, in weight percent, of: between 1.0 and 3.5% aluminium, 0.0 and 3.6% titanium, 0.0 and 6.0% niobium, 0.0 and 4.9% tantalum, 0.0 and 5.4% tungsten, 0.0 and 4.0% molybdenum, 8.9 and 30.0% cobalt, 10.8 and 20.6% chromium, 0.02 and 0.35% carbon, between 0.001 and 0.2% boron, between 0.001 and 0.5% zirconium, 0.0 and 5.0% rhenium, 0.0 and 8.5% ruthenium, 0.0 and 4.6 percent iridium, between 0.0 and 0.5% vanadium, between 0.0 and 1.0% palladium, between 0.0 and 1.0% platinum, between 0.0 and 0.5% silicon, between 0.0 and 0.1% yttrium, between 0.0 and 0.1% lanthanum, between 0.0 and 0.1% cerium, between 0.0 and 0.003% sulphur, between 0.0 and 0.25% manganese, between 0.0 and 6.0% iron, between 0.0 and 0.5% copper, between 0.0 and 0.5% hafnium, the balance being nickel and incidental impurities, wherein the following equations are satisfied in which $W_{Nb}$, $W_{Ta}$, $W_{Ti}$,

TABLE 1

Nominal composition in wt. % of commonly applied nickel-based superalloys.

| Alloy (wt. %) | Cr | Co | Mo | W | Al | Ti | Ta | Nb | Hf | C | B | Zr |
|---|---|---|---|---|---|---|---|---|---|---|---|---|
| N80A | 19.5 | 0.0 | 0.0 | 0.0 | 1.4 | 2.4 | 0.0 | 0.0 | 0.0 | 0.06 | 0.003 | 0.06 |
| N90 | 19.5 | 16.5 | 0.0 | 0.0 | 1.5 | 2.5 | 0.0 | 0.0 | 0.0 | 0.07 | 0.003 | 0.06 |
| Waspaloy | 19.5 | 13.5 | 4.3 | 0.0 | 1.3 | 3.0 | 0.0 | 0.0 | 0.0 | 0.08 | 0.006 | 0.00 |
| U500 | 18.0 | 18.5 | 4.0 | 0.0 | 2.9 | 2.9 | 0.0 | 0.0 | 0.0 | 0.08 | 0.006 | 0.05 |
| N105 | 15.0 | 20.0 | 5.0 | 0.0 | 4.7 | 1.2 | 0.0 | 0.0 | 0.0 | 0.13 | 0.005 | 0.10 |
| U700 | 15.0 | 17.0 | 5.0 | 0.0 | 4.0 | 3.5 | 0.0 | 0.0 | 0.0 | 0.06 | 0.030 | 0.00 |
| N115 | 14.3 | 13.2 | 0.0 | 0.0 | 4.9 | 3.7 | 0.0 | 0.0 | 0.0 | 0.15 | 0.160 | 0.04 |
| IN738LC | 16.0 | 8.5 | 1.8 | 2.6 | 3.4 | 3.4 | 0.0 | 0.9 | 0.0 | 0.11 | 0.010 | 0.04 |
| IN713C | 12.5 | 0.0 | 4.2 | 0.0 | 6.1 | 0.8 | 0.0 | 2.2 | 0.0 | 0.12 | 0.001 | 0.10 |
| IN939 | 22.4 | 19.0 | 0 | 2 | 1.9 | 3.7 | 1.4 | 1 | 0.0 | 0.15 | 0.009 | 0.10 |
| MM200 | 8.0 | 9.0 | 0.0 | 12.0 | 5.0 | 1.9 | 0.0 | 1.0 | 2.0 | 0.13 | 0.015 | 0.03 |
| MM247 | 8.0 | 10.0 | 0.6 | 10.0 | 5.5 | 1.0 | 3.0 | 0.0 | 0.0 | 0.15 | 0.015 | 0.03 |
| MM246 | 9.0 | 10.0 | 2.5 | 10.0 | 5.5 | 1.5 | 1.5 | 0.0 | 0.0 | 0.15 | 0.015 | 0.05 |
| IN792 | 12.4 | 9.2 | 1.9 | 3.9 | 3.5 | 3.9 | 4.2 | 0.0 | 0.0 | 0.07 | 0.016 | 0.02 |
| Rene80 | 14.0 | 9.0 | 4.0 | 4.0 | 3.0 | 4.7 | 0.0 | 0.0 | 0.8 | 0.16 | 0.015 | 0.01 |

$W_{Mo}$, $W_{Al}$, $W_{Re}$ and $W_{Ru}$ are the weight percent of niobium, tantalum, titanium, molybdenum, aluminium, rhenium and ruthenium in the alloy respectively $$4.2 \leq (W_W + 0.92 W_{Re} + 1.58 W_{Ru}) + W_{Mo}$$

$$W_{Al} + 0.5 W_{Ti} + 0.3 W_{Nb} + 0.15 W_{Ta} \leq 4.0$$

and $$3.0 \leq W_{Al} + 0.5 W_{Ti} + 1.5(0.3 W_{Nb} + 0.15 W_{Ta})$$

In a second aspect the present invention provides a nickel-based alloy composition consisting, in weight percent, of: between 1.0 and 3.5% aluminium, 0.0 and 3.6% titanium, 0.0 and 6.0% niobium, 0.0 and 4.9% tantalum, 0.0 and 5.4% tungsten, 0.0 and 4.0% molybdenum, 8.9 and 30.0% cobalt, 10.8 and 20.6% chromium, 0.02 and 0.35% carbon, between 0.001 and 0.2% boron, between 0.001 and 0.5% zirconium, 0.0 and 5.0% rhenium, 0.0 and 8.5% ruthenium, 0.0 and 4.6 percent iridium, between 0.0 and 0.5% vanadium, between 0.0 and 1.0% palladium, between 0.0 and 1.0% platinum, between 0.0 and 0.5% silicon, between 0.0 and 0.1% yttrium, between 0.0 and 0.1% lanthanum, between 0.0 and 0.1% cerium, between 0.0 and 0.003% sulphur, between 0.0 and 0.25% manganese, between 0.0 and 6.0% iron, between 0.0 and 0.5% copper, between 0.0 and 0.5% hafnium, the balance being nickel and incidental impurities, wherein the following equations are satisfied in which $W_{Nb}$, $W_{Ta}$, $W_{Ti}$, $W_{Mo}$ and $W_{Al}$ are the weight percent of niobium, tantalum, titanium, molybdenum and aluminium in the alloy respectively $$4.2 \leq W_W + W_{Mo}$$

$$W_{Al} + 0.5 W_{Ti} + 0.3 W_{Nb} + 0.15 W_{Ta} \leq 3.5$$

and $$3.0 \leq W_{Al} + 0.5 W_{Ti} + 1.5(0.3 W_{Nb} + 0.15 W_{Ta})$$

In a third aspect the present invention relates to a nickel-based alloy composition consisting, in weight percent, of: between 1.0 and 3.5% aluminium, 0.0 and 3.6% titanium, 0.0 and 6.0% niobium, 0.0 and 4.9% tantalum, 0.0 and 5.4% tungsten, 0.0 and 4.0% molybdenum, 8.9 and 30.0% cobalt, 10.8 and 20.6% chromium, 0.02 and 0.35% carbon, between 0.001 and 0.2% boron, between 0.001 and 0.5% zirconium, 0.0 and 5.0% rhenium, 0.0 and 8.5% ruthenium, 0.0 and 4.6 percent iridium, between 0.0 and 0.5% vanadium, between 0.0 and 1.0% palladium, between 0.0 and 1.0% platinum, between 0.0 and 0.5% silicon, between 0.0 and 0.1% yttrium, between 0.0 and 0.1% lanthanum, between 0.0 and 0.1% cerium, between 0.0 and 0.003% sulphur, between 0.0 and 0.25% manganese, between 0.0 and 6.0% iron, between 0.0 and 0.5% copper, between 0.0 and 0.5% hafnium, the balance being nickel and incidental impurities, wherein the following equations are satisfied in which $W_{Nb}$, $W_{Ta}$, $W_{Ti}$, $W_{Mo}$, $W_{Al}$, $W_{Re}$ and $W_{Ru}$ are the weight percent of niobium, tantalum, titanium, molybdenum, aluminium, rhenium and ruthenium in the alloy respectively $$4.2 \leq (W_W + 0.92 W_{Re} + 1.58 W_{Ru}) + W_{Mo}$$

$$W_{Al} + 0.5 W_{Ti} + 0.3 W_{Nb} + 0.15 W_{Ta} \leq 3.5$$

$$3.0 \leq W_{Al} + 0.5 W_{Ti} + 1.5(0.3 W_{Nb} + 0.15 W_{Ta})$$

and $$W_W + W_{Mo} \leq 4.2$$

In a fourth aspect the present invention relates to a nickel-based alloy composition consisting, in weight percent, of: between 1.0 and 3.5% aluminium, 0.0 and 3.6% titanium, 0.0 and 6.0% niobium, 0.0 and 4.9% tantalum, 0.0 and 5.4% tungsten, 0.0 and 4.0% molybdenum, 8.9 and 30.0% cobalt, 10.8 and 20.6% chromium, 0.02 and 0.35% carbon, between 0.001 and 0.2% boron, between 0.001 and 0.5% zirconium, 0.0 and 5.0% rhenium, 0.0 and 8.5% ruthenium, 0.0 and 4.6 percent iridium, between 0.0 and 0.5% vanadium, between 0.0 and 1.0% palladium, between 0.0 and 1.0% platinum, between 0.0 and 0.5% silicon, between 0.0 and 0.1% yttrium, between 0.0 and 0.1% lanthanum, between 0.0 and 0.1% cerium, between 0.0 and 0.003% sulphur, between 0.0 and 0.25% manganese, between 0.0 and 6.0% iron, between 0.0 and 0.5% copper, between 0.0 and 0.5% hafnium, the balance being nickel and incidental impurities, wherein the following equations are satisfied in which $W_{Nb}$, $W_{Ta}$, $W_{Ti}$, $W_{Mo}$, $W_{Al}$, $W_{Re}$ and $W_{Ru}$ are the weight percent of niobium, tantalum, titanium, molybdenum, aluminium, rhenium and ruthenium in the alloy respectively $$4.2 \leq W_W + W_{Mo}$$

$$3.5 \leq W_{Al} + 0.5 W_{Ti} + 0.3 W_{Nb} + 0.15 W_{Ta} \leq 4.0$$

$$3.0 \leq W_{Al} + 0.5 W_{Ti} + 1.5(0.3 W_{Nb} + 0.15 W_{Ta})$$

In a fifth aspect the present invention relates to a nickel-based alloy composition consisting, in weight percent, of: between 1.0 and 3.5% aluminium, 0.0 and 3.6% titanium, 0.0 and 6.0% niobium, 0.0 and 4.9% tantalum, 0.0 and 5.4% tungsten, 0.0 and 4.0% molybdenum, 8.9 and 30.0% cobalt, 10.8 and 20.6% chromium, 0.02 and 0.35% carbon, between 0.001 and 0.2% boron, between 0.001 and 0.5% zirconium, 0.0 and 5.0% rhenium, 0.0 and 8.5% ruthenium, 0.0 and 4.6 percent iridium, between 0.0 and 0.5% vanadium, between 0.0 and 1.0% palladium, between 0.0 and 1.0% platinum, between 0.0 and 0.5% silicon, between 0.0 and 0.1% yttrium, between 0.0 and 0.1% lanthanum, between 0.0 and 0.1% cerium, between 0.0 and 0.003% sulphur, between 0.0 and 0.25% manganese, between 0.0 and 6.0% iron, between 0.0 and 0.5% copper, between 0.0 and 0.5% hafnium, the balance being nickel and incidental impurities, wherein the following equations are satisfied in which $W_{Nb}$, $W_{Ta}$, $W_{Ti}$, $W_{Mo}$, $W_{Al}$, $W_{Re}$ and $W_{Ru}$ are the weight percent of niobium, tantalum, titanium, molybdenum, aluminium, rhenium and ruthenium in the alloy respectively $$4.2 \leq (W_W + 0.92 W_{Re} + 1.58 W_{Ru}) + W_{Mo}$$

$$3.5 \leq W_{Al} + 0.5 W_{Ti} + 0.3 W_{Nb} + 0.15 W_{Ta} \leq 4.0$$

$$3.0 \leq W_{Al} + 0.5 W_{Ti} + 1.5(0.3 W_{Nb} + 0.15 W_{Ta})$$

and $$W_W + W_{Mo} \leq 4.2$$

All of the further limitations disclosed herein in relation to the first aspect (or any other aspect) can apply equally to the second and/or third and/or fourth and/or fifth aspects.

These alloys provide a balance between strength and additive manufacturability not previously achievable.

The term "consisting of" is used herein to indicate that 100% of the composition is being referred to and the presence of additional components is excluded so that percentages add up to 100%. Unless otherwise stated, percents are expressed in weight percent.

BRIEF DESCRIPTION OF FIGURES

The invention will be more fully described, by way of example only, with reference to the accompanying drawings in which.

DETAILED DESCRIPTION OF EMBODIMENTS

Figure 1:
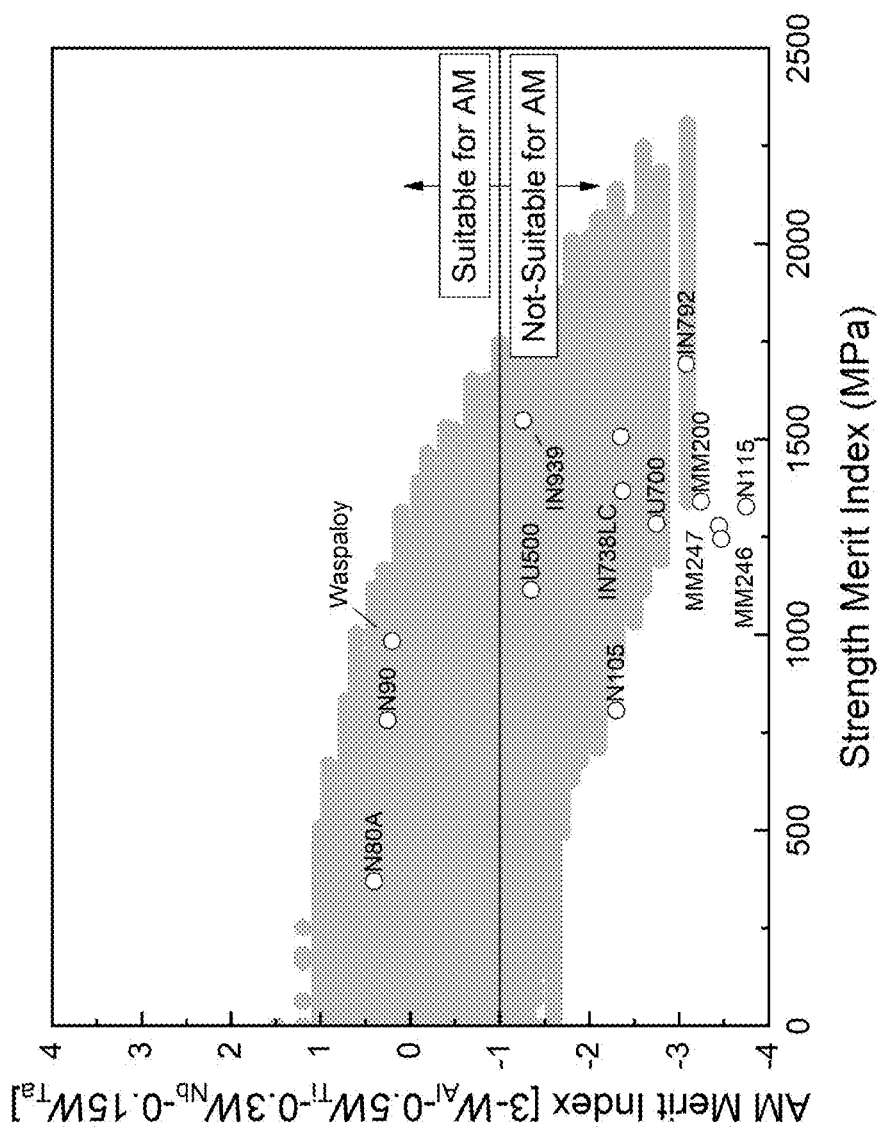
FIG. 1 shows the calculated trade-off between the yield strength (in terms of strength merit index) and ease of processing by Additive Manufacturing (in terms of AM Index) within the alloy design space listed in Table 2.

Traditionally, nickel-based superalloys have been designed through empiricism. Thus their chemical compositions have been isolated using time consuming and expensive experimental development, involving small-scale processing of limited quantities of material and subsequent characterisation of their behaviour. The alloy composition adopted is then the one found to display the best, or most desirable, combination of properties. The large number of possible alloying elements indicates that these alloys are not entirely optimised and that improved alloys are likely to exist.

In superalloys, generally additions of chromium (Cr) and aluminium (Al) are added to impart resistance to oxidation/corrosion, cobalt (Co) is added to improve resistance to sulphidisation. For creep resistance, molybdenum (Mo), tungsten (W) and cobalt (Co) are introduced, because these retard the thermally-activated processes—such as, dislocation climb—which determine the rate of creep deformation. To promote static and cyclic strength, aluminium (Al), tantalum (Ta), niobium (Nb) and titanium (Ti) are introduced as these promote the formation of the precipitate hardening phase gamma-prime (γ'). This precipitate phase is coherent with the face-centered cubic (FCC) matrix phase which is referred to as gamma (γ).

A modelling-based approach used for the isolation of new grades of nickel-based superalloys is described here, termed the "Alloys-By-Design" (ABD) method. This approach utilises a framework of computational materials models to estimate design relevant properties across a very broad compositional space. In principle, this alloy design tool allows the so called inverse problem to be solved; identifying optimum alloy compositions that best satisfy a specified set of design constraints.

The first step in the design process is the definition of an elemental list along with the associated upper and lower compositional limits. The compositional limits for each of the elemental additions considered in this invention—referred to as the "alloy design space"—are detailed in Table 2.

TABLE 2

| Alloys design space in wt. % searched using the "Alloys-by-Design" method. | | | | | | | | |
|---|---|---|---|---|---|---|---|---|
| Alloy (wt. %) | Al | Co | Cr | Mo | Nb | Ta | Ti | W |
| Min | 0.0 | 0.0 | 4.0 | 0.0 | 0.0 | 0.0 | 0.0 | 0.0 |
| Max | 4.0 | 35.0 | 25.0 | 12.0 | 10.0 | 12.0 | 4.0 | 12.0 |

The balance is nickel. The levels of carbon, boron and zirconium where fixed at 0.06%, 0.01% and 0.006% respectively. These elements are known to be advantageously present to provide strength at grain boundaries.

The second step relies upon thermodynamic calculations used to calculate the phase diagram and thermodynamic properties for a specific alloy composition. Often this is referred to as the CALPHAD method (CALculate PHAse Diagram). These calculations are conducted at the typical service temperature for the new alloy (900° C.), providing information about the phase equilibrium (microstructure).

A third stage involves isolating alloy compositions which have the desired microstructural architecture. In the case of nickel based superalloys which require superior resistance to creep deformation, the creep rupture life generally improves as the volume fraction of the precipitate hardening phase $\gamma'$ is increased, the most beneficial range for volume fraction of $\gamma'$ lies between 60%-70% at 900° C. (however often due to other design restraints volume fraction may be limited to lower values than this). At values above 70% volume fraction of $\gamma'$ a drop in creep resistance is observed.

It is also necessary that the $\gamma/\gamma'$ lattice misfit should conform to a small value, either positive or negative, since coherency is otherwise lost; thus limits are placed on its magnitude. The lattice misfit $\delta$ is defined as the mismatch between $\gamma$ and $\gamma'$ phases, and is determined according to $$\delta = \frac{2(a_{\gamma'} - a_\gamma)}{a_{\gamma'} + a_\gamma} \quad (1)$$

where $a_\gamma$ and $a_{\gamma'}$ are the lattice parameters of the $\gamma$ and $\gamma'$ phases.

Thus the model isolates all compositions in the design space which are calculated to result in a desired volume fraction of $\gamma'$, which have a lattice misfit $\gamma'$ of less than a predetermined magnitude.

In the fourth stage, merit indices are estimated for the remaining isolated alloy compositions in the dataset. Examples of these include: creep-merit index (which describes an alloy's creep resistance based solely on mean composition), strength-merit index (which describes an alloy's precipitation yield strength based solely on mean composition), solid-solution merit index (which describes an alloy's solid solution yield strength based solely on mean composition), density and cost.

In the fifth stage, the calculated merit indices are compared with limits for required behaviour, these design constraints are considered to be the boundary conditions to the problem. All compositions which do not fulfil the boundary conditions are excluded. At this stage, the trial dataset will be reduced in size quite markedly.

The final, sixth stage involves analysing the dataset of remaining compositions. This can be done in various ways. One can sort through the database for alloys which exhibit maximal values of the merit indices—the lightest, the most creep resistant, the most oxidation resistant, and the cheapest for example. Or alternatively, one can use the database to determine the relative trade-offs in performance which arise from different combination of properties.

The example seven merit indicies are now described.

The first merit index is the creep-merit index. The overarching observation is that time-dependent deformation (i.e. creep) of a nickel-based superalloy occurs by dislocation creep with the initial activity being restricted to the $\gamma$ phase. Thus, because the fraction of the $\gamma'$ phase is large, dislocation segments rapidly become pinned at the $\gamma/\gamma'$ interfaces. The rate-controlling step is then the escape of trapped configurations of dislocations from $\gamma/\gamma'$ interfaces, and it is the dependence of this on local chemistry—in this case composition of the $\gamma$ phase—which gives rise to a significant influence of alloy composition on creep properties.

A physically-based microstructure model can be invoked for the rate of accumulation of creep strain when loading is uniaxial and along the $\langle 001 \rangle$ crystallographic direction. The equation set is $$\dot{\varepsilon}_{\langle 001 \rangle} = \frac{16}{\sqrt{6}} \rho_m \phi_p D_{\text{eff}} (1-\phi_p)(1/\phi_p^{1/3}-1)\sinh\left\{\frac{\sigma b^2 \omega}{\sqrt{6}K_{CF}kT}\right\} \quad (2)$$

$$\dot{\rho}_m = C\dot{\varepsilon}_{\langle 001 \rangle} \quad (3)$$

where $\rho_m$ is the mobile dislocation density, $\phi_p$ is the volume fraction of the $\gamma'$ phase, and $\omega$ is width of the matrix channels. The terms $\sigma$ and T are the applied stress and temperature, respectively. The terms $b$ and $k$ are the Burgers vector and Boltzmann constant, respectively. The term $K_{CF}$ $1+2\phi_p^{1/3}/3\sqrt{3\pi}(1-\phi_p^{1/3})$ is a constraint factor, which accounts for the close proximity of the cuboidal particles in these alloys. Equation 3 describes the dislocation multiplication process which needs an estimate of the multiplication parameter C and the initial dislocation density. The term $D_{\text{eff}}$ is the effective diffusivity controlling the climb processes at the particle/matrix interfaces.

Note that in the above, the composition dependence arises from the two terms $\phi_p$ and $D_{\text{eff}}$. Thus, provided that the microstructural architecture is assumed constant (microstructural architecture is mostly controlled by heat treatment) so that $\phi_p$ is fixed, any dependence upon chemical composition arises through $D_{\text{eff}}$. For the purposes of the alloy design modelling described here, it turns out to be unnecessary to implement a full integration of Equations 2 and 3 for each prototype alloy composition. Instead, a first order merit index $M_{creep}$ is employed which needs to be maximised, which is given by $$M_{creep} = \Sigma_i x_i / \tilde{D}_i \quad (4)$$

where $x_i$ is the atomic fraction of solute i in the $\gamma$ phase and $\tilde{D}_i$ is the appropriate interdiffusion coefficient.

The second merit index is a strength merit index. For high nickel-based superalloys, the vast majority of strength comes from the precipitate phase. Therefore, optimising alloy composition for maximal precipitate strengthening is a critical design consideration. From hardening theory a merit index for strength, $M_{strength}$, is proposed. The index considers the maximum possible precipitate strength—determined to be the point where the transition from weakly coupled to strongly coupled dislocation shearing occurs—which can be approximated using, $$M_{strength} = \overline{M} \cdot \frac{1}{2}\gamma_{APB}\phi_p^{1/2}/b \quad (5)$$

where $\overline{M}$ is the Taylor factor, $\gamma_{APB}$ is the anti-phase boundary (APB) energy, $\phi_p$ is the volume fraction of the $\gamma'$ phase and b is the Burgers vector.

From Equation 5 it is apparent that fault energies in the $\gamma'$ phase—for example, the anti-phase boundary APB energy—have a significant influence on the deformation behaviour of nickel-based superalloys. Increasing the APB energy has been found to improve mechanical properties including, tensile strength and resistance to creep deformation. The APB energy was studied for a number of Ni—Al—X systems using density functional theory. From this work the effect of ternary elements on the APB energy of the $\gamma'$ phase was calculated, linear superposition of the effect for each ternary addition was assumed when considering complex multicomponent systems, resulting in the following equation, $$\gamma_{APB} = 195 - 1.7x_{Cr} - 1.7x_{Mo} + 4.6x_W + 27.1x_{Ta} + 21.4X_{Nb} + 15x_{Ti} \quad (6)$$

where, $x_{Cr}$, $x_{Mo}$, $x_W$, $x_{Ta}$, $x_{Nb}$ and $X_{Ti}$ represent the concentrations, in atomic percent, of chromium, molybdenum, tungsten, tantalum, niobium and titanium in the γ' phase, respectively. The composition of the γ' phase is determined from phase equilibrium calculations.

The third merit index is solid solution merit index. Solid solution hardening occurs in the (FCC) matrix phase which is referred to as gamma (γ), in particular this hardening mechanism is important at high temperatures. A model which assumes superposition of individual solute atoms on the strengthening of the matrix phase is employed. The solid solution strengthening coefficients, $k_i$, for the elements considered in the design space: aluminium, cobalt, chromium, molybdenum, niobium, tantalum, titanium and tungsten are 225, 39.4, 337, 1015, 1183, 1191, 775 and 977 MPa/at.%$^{1/2}$, respectively. The solid-solution index is calculated based upon the equilibrium composition of the matrix phase using the following equation, $$M_{solid-solution} = \Sigma_i (k_i^2 \sqrt{x_i}) \quad (7)$$

where, $M_{solid-solution}$ is the solid solution merit index and $x_i$ is the concentration of element i in the γ matrix phase.

The fourth merit index is density. The density, ρ, was calculated using a simple rule of mixtures and a correctional factor, where, $\rho_i$ is the density for a given element and $x_i$ is the atomic fraction of the alloy element.

$$\rho = 1.05[\Sigma_i x_i \rho_i] \quad (8)$$

The fifth merit index is cost. In order to estimate the cost of each alloy a simple rule of mixtures was applied, where the weight fraction of the alloy element, $x_i$, was multiplied by the current (2016) raw material cost for the alloying element, $c_i$.

$$Cost = \Sigma_i x_i c_i \quad (9)$$

The estimates assume that processing costs are identical for all alloys, i.e. that the product yield is not affected by composition.

Figure 2:
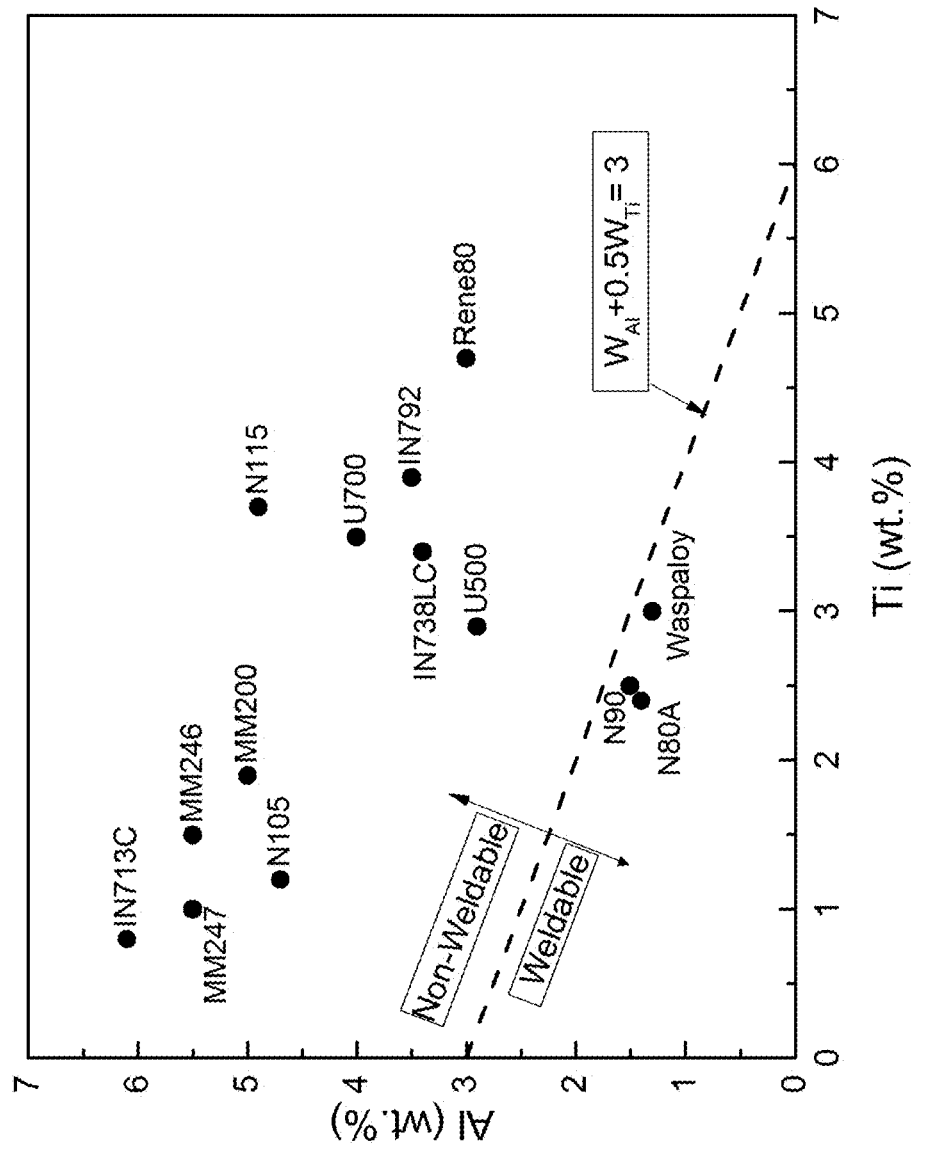
FIG. 2 is a contour plot showing the effect of Al and Ti on the susceptibility of nickel-based superalloys to cracking during welding (modified from M Prager, C. S. Shira, *Welding Research Council Bulletin*, pp 128, (1968))

The sixth merit index is an Additive Manufacturing (AM) index. The ability of an alloy to be processed by additive manufacturing is related to the chemical composition. The ability for AM is related to the criterion used to assess the ability to weld ("weldability") a nickel superalloy. The index is developed from the empirical observations which relate alloy composition to the weldability of nickel-based superalloys (FIG. 2). In this relationship a factor of 0.5 is added to the titanium content to convert this to an "aluminium equivalent" as titanium has approximately twice the density of aluminium. In effect the additive manufacturing process for metallic alloys is a continuous welding process. There has been adaption of previous observations which only relate weldability to aluminium and titanium content. A modification is included to account for the influence of tantalum and niobium, which behave in a similar manner to aluminium and titanium during solidification. Similar to titanium a constant is added to convert these elemental additions to an "aluminium equivalent", thus, niobium and tantalum have correctional factors (determined from their density relative to aluminium) of 0.3 and 0.15 respectively. The AM index is applied via the following equation $$M_{Additive-Manufacture} = 3 - (W_{Al} + 0.5W_{Ti} + 0.3W_{Nb} + 0.15W_{Ta}) \quad (10)$$

where $W_{Al}$, $W_{Ti}$, $W_{Nb}$, and $W_{Ta}$ the weight percent of aluminium, titanium, niobium and tantalum in the alloy by weight percent. A lower value of this AM index indicates a better response to the additive manufacture process. A value of AM index of −1.0 or greater will result in satisfactory additive manufacturability (see FIG. 14 and related description). Preferably the value is −0.5 or greater or even zero or greater as this indicates ease of processing by additive manufacture.

A seventh merit index is based upon rejection of candidate alloys on the basis of unsuitable microstructural architecture made on the basis of susceptibility to TCP phases. To do this use is made of the d-orbital energy levels of the alloying elements (referred as Md) to determine the total effective Md level according to $$\overline{M_d} = \Sigma_i x_i M d_i \quad (11)$$

where the $x_i$ represents the mole fraction of the element i in the alloy. Higher values of Md are indicative of higher probability of TCP formation.

The ABD method described above was used to isolate the inventive alloy composition. The design intent for this alloy was to optimise the composition of a nickel-based alloy for the production of high strength corrosion resistance engineering artefacts via AM processes, in particular for applications where high temperature strength (tensile strength, creep strength) beyond 650° C. is required, this is combined with an excellent balance of material cost and density.

The material properties—determined using the ABD method—for the typical compositions of conventionally cast nickel-based alloys, listed in Table 1, are listed in Table 3. The design of the new alloy was considered in relation to the predicted properties listed for these alloys.

The rationale for the design of the new alloy is now described.

TABLE 3

Calculated phase fractions and merit indices made with the "Alloys-by-Design" software.
Results for nickel-based superalloys listed in Table 1.

| Alloy | Phase Fractions | | | Creep Merit | | | γ/γ' | | Strength Merit | Solid Solution Merit | |
|---|---|---|---|---|---|---|---|---|---|---|---|
| | γ' | σ + μ + P | $Md_\gamma$ | Index ($m^{-2}s \times 10^{-15}$) | Density (g/cm³) | Cost (£/kg) | Misfit (%) | γ' Solvus (° C.) | Index (Mpa) | Index (Mpa) | AM Index |
| N80A | 0.03 | 0.00 | 0.880 | 1.57 | 8.48 | 18.39 | 0.58% | 921 | 371 | 63 | 0.40 |
| N90 | 0.11 | 0.00 | 0.880 | 4.97 | 8.46 | 26.62 | 0.66% | 993 | 782 | 60 | 0.25 |
| Waspaloy | 0.16 | 0.00 | 0.901 | 5.30 | 8.50 | 26.61 | 0.36% | 1028 | 985 | 84 | 0.20 |
| U500 | 0.28 | 0.00 | 0.918 | 6.73 | 8.25 | 28.85 | 0.01% | 1102 | 1116 | 82 | −1.35 |

TABLE 3-continued

Calculated phase fractions and merit indices made with the "Alloys-by-Design" software.
Results for nickel-based superalloys listed in Table 1.

| Alloy | Phase Fractions | | | Creep Merit Index ($m^{-2}s \times 10^{-15}$) | Density ($g/cm^3$) | Cost (£/kg) | $\gamma/\gamma'$ Misfit (%) | $\gamma'$ Solvus (° C.) | Strength Merit Index (Mpa) | Solid Solution Merit Index (Mpa) | AM Index |
|---|---|---|---|---|---|---|---|---|---|---|---|
| | $\gamma'$ | $\sigma + \mu + P$ | $Md_\gamma$ | | | | | | | | |
| N105 | 0.28 | 0.00 | 0.932 | 6.90 | 8.14 | 29.99 | −0.39% | 1066 | 807 | 81 | −2.30 |
| U700 | 0.42 | 0.02 | 0.931 | 7.00 | 8.09 | 28.40 | −0.24% | 1154 | 1285 | 89 | −2.75 |
| N115 | 0.51 | 0.00 | 0.906 | 5.31 | 7.90 | 24.63 | 0.21% | 1192 | 1329 | 59 | −3.75 |
| IN738LC | 0.41 | 0.00 | 0.915 | 5.16 | 8.25 | 23.58 | 0.15% | 1144 | 1368 | 80 | −2.37 |
| IN713C | 0.57 | 0.00 | 0.930 | 2.77 | 7.97 | 20.33 | −0.33% | 1202 | 1168 | 87 | −4.16 |
| IN939 | 0.34 | 0.11 | 0.918 | 7.46 | 8.38 | 29.27 | 0.56% | 1130 | 1549 | 86 | −1.26 |
| MM200 | 0.63 | 0.01 | 0.922 | 7.85 | 8.64 | 44.15 | −0.01% | 1226 | 1342 | 88 | −3.25 |
| MM247 | 0.58 | 0.00 | 0.918 | 7.51 | 8.60 | 42.76 | −0.15% | 1212 | 1279 | 85 | −3.45 |
| MM246 | 0.59 | 0.03 | 0.930 | 7.34 | 8.51 | 26.97 | −0.35% | 1191 | 1246 | 90 | −3.47 |
| IN792 | 0.52 | 0.00 | 0.924 | 6.40 | 8.46 | 28.62 | 0.11% | 1164 | 1693 | 91 | −3.08 |
| Rene80 | 0.47 | 0.02 | 0.926 | 6.11 | 8.36 | 32.40 | 0.01% | 1168 | 1507 | 95 | −2.35 |

As presented in FIG. 1 there is a trade-off between alloy strength—as calculated by the strength merit index—and the suitability for an alloy to be manufactured via AM—as calculated by the AM merit index (where a value for the AM merit index of less than −1.0 implies processing is difficult). The position of a number of well-know, commercially used nickel-based superalloys is delineated on this diagram. It is demonstrated by this diagram that with increasing strength processing is made more difficult. Also shown in FIG. 1 are the many millions of alloy compositions studied which fall within the composition space described in Table 2 (the shaded area). It is shown that although there is this trade-off it is possible to haven alloys with improved balance of high strength combined with much improved ability to be processed via AM. The isolation of alloy compositions which provide this beneficial effect is described in the following sections.

Figure 3:
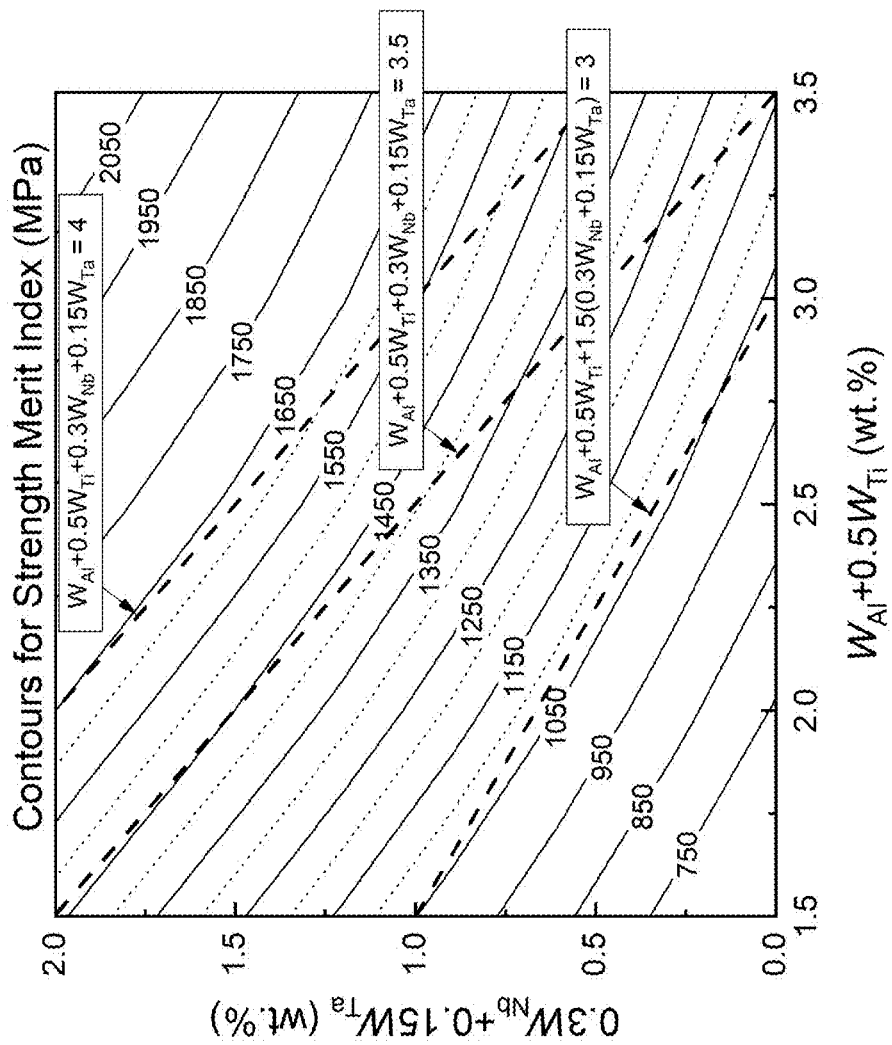
FIG. 3 is a contour plot showing the effect of the sum of elements aluminium and titanium on the x axis vs the sum of elements niobium and tantalum on the y axis on yield strength (in terms of strength merit index), superimposed is the preferred limit for AM merit index ($M_{Additive-Manufacture} \geq -1.0$)

FIG. 3 describes the relationship between the addition of elements which are predominantly added to form the $\gamma'$ phase and the calculated strength merit index. The elements which form the $\gamma'$ phase may also reduce the ease by which an alloy can be processed by AM, as described in the AM merit index (Equation 10). Thus the combination of these elements must be optimised to provide the optimal balance between ability for AM processing and strength. Plotted on the figure is a dotted line depicting the limit at which alloys are considered readily processable by AM, elemental ranges which lie above the line are less preferable because they limit the processing of the alloy. The line has the following equation $$W_{Al}+0.5W_{Ti}+0.3W_{Nb}+0.15W_{Ta}=4.0$$

where $W_{Al}$, $W_{Ti}$, $W_{Nb}$ and $W_{Ta}$ are the weight percent of aluminium, titanium, niobium and tantalum in the alloy respectively. Although the additive manufacturing equation shows that a maximum allowable level of aluminium is 4.0 wt %, aluminium is known to raise the gamma prime phase solvus temperature. A low gamma prime solvus temperature is preferable for AM processability as it reduces the build-up of strains in the as-build state. Thus, the aluminium content is restricted to 3.5 wt. % and lower to help achieve a low gamma prime solvus temperature, for example a maximum gamma prime solvus temperature of 1100 deg C. which would provide an alloy with a solvus below the range of the alloys listed in Table 3 (Crudden et al. *Acta Materialia* 75 (2014) 356-370). Preferably the maximum concentration of aluminium is limited to 3.5 weight percent (more preferably 3.0 wt. % or even 2.5 wt. % or 2.2 wt. % to ensure good additive manufacturability). Satisfying this equation means the AM merit index is at least −0.5. The higher the AM merit index, the easier AM processing, so preferably $W_{Al}$+0.5$W_{Ti}$+0.3$W_{Nb}$+0.15$W_{Ta}$≤3.4, more preferably $W_{Al}$+0.5$W_{Ti}$+0.3$W_{Nb}$+0.15$W_{Ta}$≤3.3, even more preferably $W_{Al}$+0.5$W_{Ti}$+0.3$W_{Nb}$+0.15$W_{Ta}$≤3.2 even more preferably $W_{Al}$+0.5$W_{Ti}$+0.3$W_{Nb}$+0.15$W_{Ta}$≤3.1 and most preferably $W_{Al}$+0.5$W_{Ti}$+0.3$W_{Nb}$+0.15$W_{Ta}$≤3.0.

The addition of elements titanium, niobium and tantalum are added in substitution for the element aluminium, these elements partition to the $\gamma'$ phase. If the combination of these elements (by atomic percent) is substantially greater than the sum of the aluminium content (by atomic percent) then the stability of the $\gamma'$ phase may be reduced, resulting in the formation of of unwanted phases such as delta ($\delta$) or eta ($\eta$). The ratio of the elements—in atomic percent—is approximated by converting the weight percent of the elements titanium, niobium and tantalum by their relative density to aluminium, approximated to 0.5, 0.3 and 0.15 respectively. Thus it is preferred if the ratio of the sum of the element titanium, niobium and tantalum to aluminium is retained to less than 1.5, such that the following equation is satisfied $$\frac{0.5W_{Ti} + 0.3W_{Nb} + 0.15W_{Ta}}{W_{Al}} \leq 1.5$$

Therefore titanium is limited to 3.6 wt. %, niobium is limited to 6.0 wt. % and tantalum is limited to 12.0 wt. %, given the maximum allowable Al level of 3.5 wt. %. More preferably the ratio of the sum of the element titanium, niobium and tantalum to aluminium is retained to less than 1.125 to provide better stability of the $\gamma'$ phase. Therefore it is more preferable that titanium is limited to 3.1 wt. %, niobium is limited to 5.1 wt. % and tantalum is limited to 10.3 wt. %. Most preferably the ratio of the sum of the element titanium, niobium and tantalum to aluminium is retained to less than 1.00 to provide better stability of the $\gamma'$ phase. Therefore it is more preferable that titanium is limited to 3.0 wt. %, niobium is limited to 5.0 wt. % and tantalum is limited to 10.0 wt. %.

Figure 6:
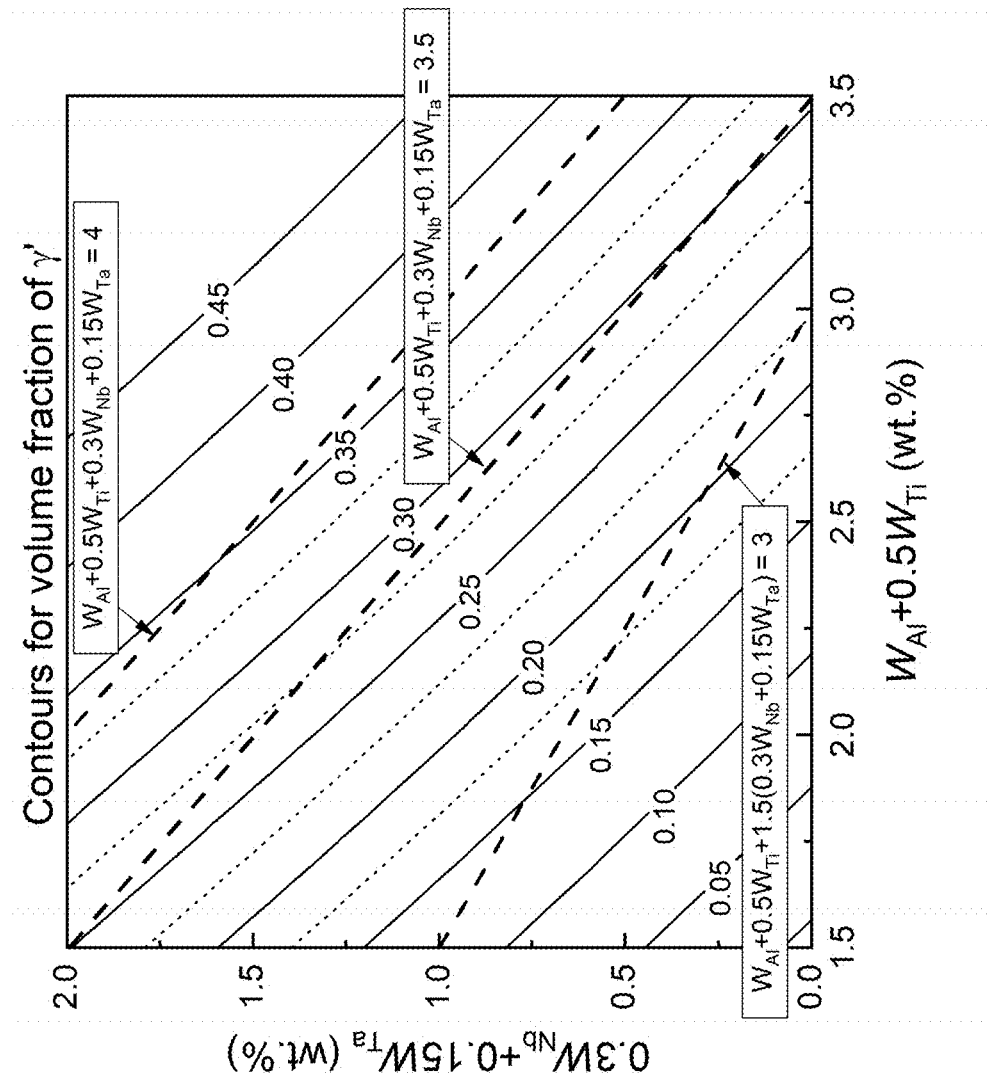
FIG. 6 is a contour plot showing the effect of the sum of elements aluminium and titanium on the x axis vs the sum of elements niobium and tantalum on the y axis on volume fraction of γ' at 900° C., superimposed are different values of the AM merit index.

The use of tantalum and/or niobium increases the strength merit index and the gamma prime volume fraction, see FIGS. 3 and 6. Therefore, it is preferable to have the sum of the elements of tantalum and niobium (0.3Nb+0.15Ta)>0.1 more preferably >0.15 even more preferably >0.2 as it increase the strength by maximising gamma prime precipitate strengthening.

In instances where high strength is preferred a minimum of 0.1 wt. % or more tantalum, preferably 0.3 wt. % or more tantalum is beneficial.

In instances where lower alloy cost is preferred it is favoured to use niobium, therefore it is preferred to have a minimum of 0.1 wt. % or more niobium, preferably 0.3 wt. % or more niobium.

The use of titanium in addition to aluminium increases the strength merit index, see FIG. 3. Thus, it is preferable to add 0.1 wt. % or more of titanium, preferably 0.3 wt. % or more titanium.

The use of titanium, tantalum and niobium in substitution for aluminium in the gamma prime phase results in higher ABP energies, see Equation 6. Therefore it is preferable to have a ratio of (0.5Ti+0.3Nb+0.15Ta)/Al≥0.75 preferably ≥0.9, more preferably ≥1.0 as this results in a high strength (Crudden et al. *Acta Materialia* 75 (2014) 356-370).

The elements platinum, palladium behave in a similar way to that of tantalum, titanium and niobium i.e. they are gamma prime forming elements which increase anti-phase boundary energy. These elements can optionally be added to the alloy in substitution for the elements tantalum, titanium and niobium. The benefits of this may include an improvement in resistance to high temperature corrosion. The "aluminium equivalent", for platinum and palladium require correctional factors (determined from their density relative to aluminium) of 0.125 and 0.225 respectively. However, additions of these elements must be limited due to the high cost of these elemental additions. Therefore, those elements can each be present in an amount of up to 1.0 wt. %, preferably they are limited to less than 0.5 wt. % and most preferable less than 0.1 wt. % as this range provides the best balance of cost and improvement to corrosion resistance. It is preferred that the following equation is satisfied to provide good processing by additive manufacturing $$W_{Al}+0.5W_{Ti}+0.3W_{Nb}+0.15W_{Ta}+0.125W_{Pt}+0.225W_{Pd} \leq 4.0$$

preferably $$W_{Al}+0.5W_{Ti}+0.3W_{Nb}+0.15W_{Ta}+0.125W_{Pt}+0.225W_{Pd} \leq 3.0$$

where $W_{Pt}$ and $W_{Pd}$ are the weight percent of platinum and palladium in the alloy respectively.

The minimal strength requirement for the strength merit index was 1050 MPa, giving the alloy a strength advantage over the strongest alloys listed in Table 3 which have a positive value for the AM index. FIG. 3 shows how the sum of the elements aluminium and titanium and the sum of the elements niobium and tantalum influence alloy strength (in terms of strength merit index). To achieve the required strength merit index the following equation, plotted in FIG. 3, should be met $$3.0 \leq W_{Al}+0.5W_{Ti}+1.5(0.3W_{Nb}+0.15W_{Ta})$$

More preferably to provide a strength merit index of greater than 1050 MPa the the following equation should be met $$3.1 \leq W_{Al}+0.5W_{Ti}+1.5(0.3W_{Nb}+0.15W_{Ta})$$

The higher the sum of $W_{Al}+0.5W_{Ti}+1.5(0.3W_{Nb}+0.15W_{Ta})$ the higher the strength merit index. Preferably the sum of $W_{Al}+0.5W_{Ti}+0.3W_{Nb}+0.15W_{Ta}$ is 3.2 or greater, more preferably 3.3 or greater, even more preferably 3.4 or greater and most preferably 3.5 or greater, which gives a strength merit index of about 1150 MPa.

Figure 4:
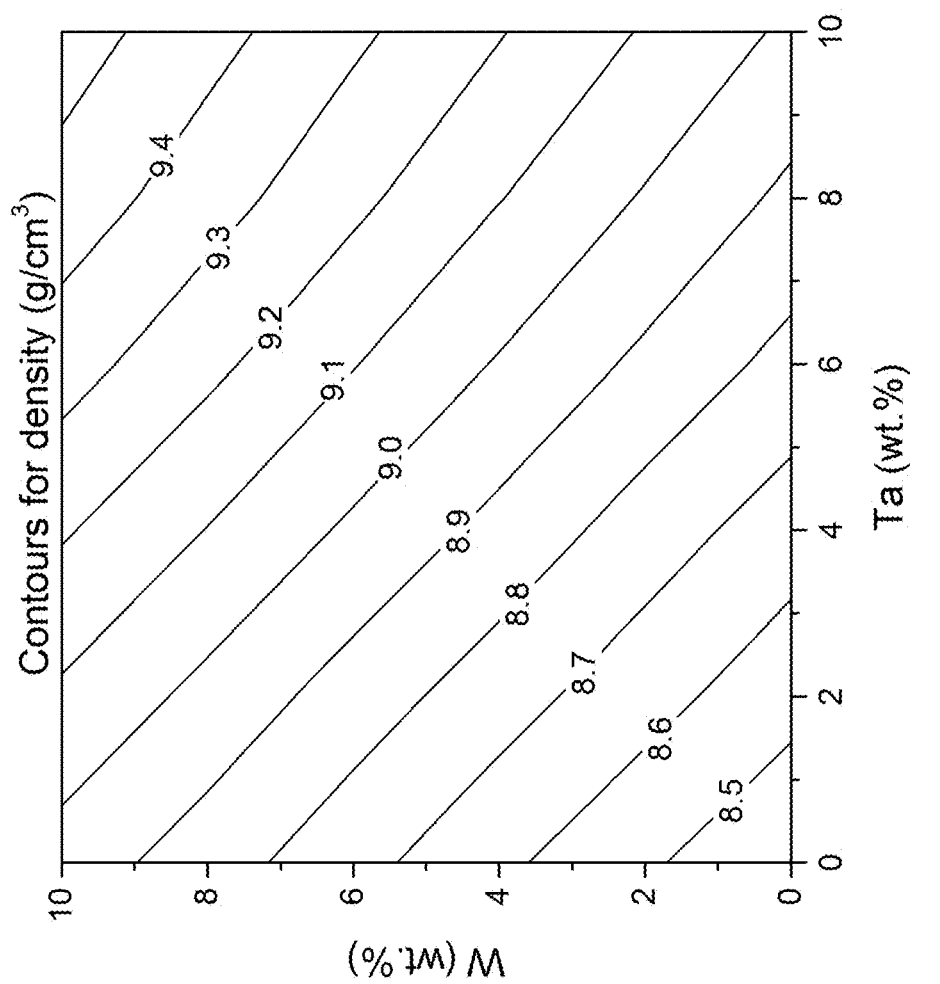
FIG. 4 is a contour plot showing the effect of elements tungsten and tantalum on alloy density, for alloys with the preferred AM index ($M_{Additive-Manufacture} \geq 0$)

In combination with a good level of tensile strength—as determined by the strength merit index—it is also beneficial to aim to limit the density of the alloy. Some elemental additions—whilst increasing mechanical strength—negatively influence density and thus a trade-off in alloy strength and alloy density must be managed. The elements in the alloy design space which most strongly increase density are tungsten and tantalum. For alloys which meet the AM merit index of 0.0 or greater the influence on alloy density is depicted in FIG. 4. It is preferable that the specific strength merit index of the new alloy (calculated by dividing the strength merit index by density) is higher than that of Waspaloy which a specific strength merit index of 115.8 MPa·cm³·g⁻¹. Thus if the minimum strength merit index of the new alloy is 1050 MPa it is desirable to limit the density, for example to less than 8.7 g/cm³ which would provide an alloy with a density within the upper and lower range of the alloys listed in Table 3 and an improvement in specific strength compared to Waspaloy. Therefore the tungsten content of the alloy is limited to less than 5.4 wt. % and the limit for tantalum additions is 4.9 wt. %. In order to limit the density of the alloy additions of tungsten and tantalum preferably adhere to the following Equation, $$f(\text{Density})=1.1W_{Ta}+W_W$$

where, f(Density) is a numerical value which is is less than or equal to 5.4 in order to produce an alloy with a density of less than 8.7 g/cm³. Rhenium and/or ruthenium can substitute for tungsten resulting in the following equation: $1.1 W_{Ta}+(W_W+0.92 W_{Re}+1.58 W_{Ru})$.

As previously described the yield stress and creep resistance of the alloy is increased by controlling the γ' volume fraction and strength merit index. Further improvements in alloy strength can be achieved by adding elements which partition to the face-centered cubic (FCC) matrix phase which is referred to as gamma (γ). The influence of elements on the strength of the γ phase is calculated using the solid solution merit index (SSI). The γ phase of the current invention is primarily composed of the elements, molybdenum, cobalt, chromium and tungsten. Chromium does not strongly effect solid solution strengthening of the γ phase and is added primarily increase the oxidation and corrosion resistance of the alloy (FIG. 12). Cobalt does not strongly effect solid solution strengthening of the γ phase but has a beneficial effect upon the creep merit index, described in FIGS. 8-11. The elements molybdenum and tungsten were found to most strongly effect the solid solution index.

Figure 5:
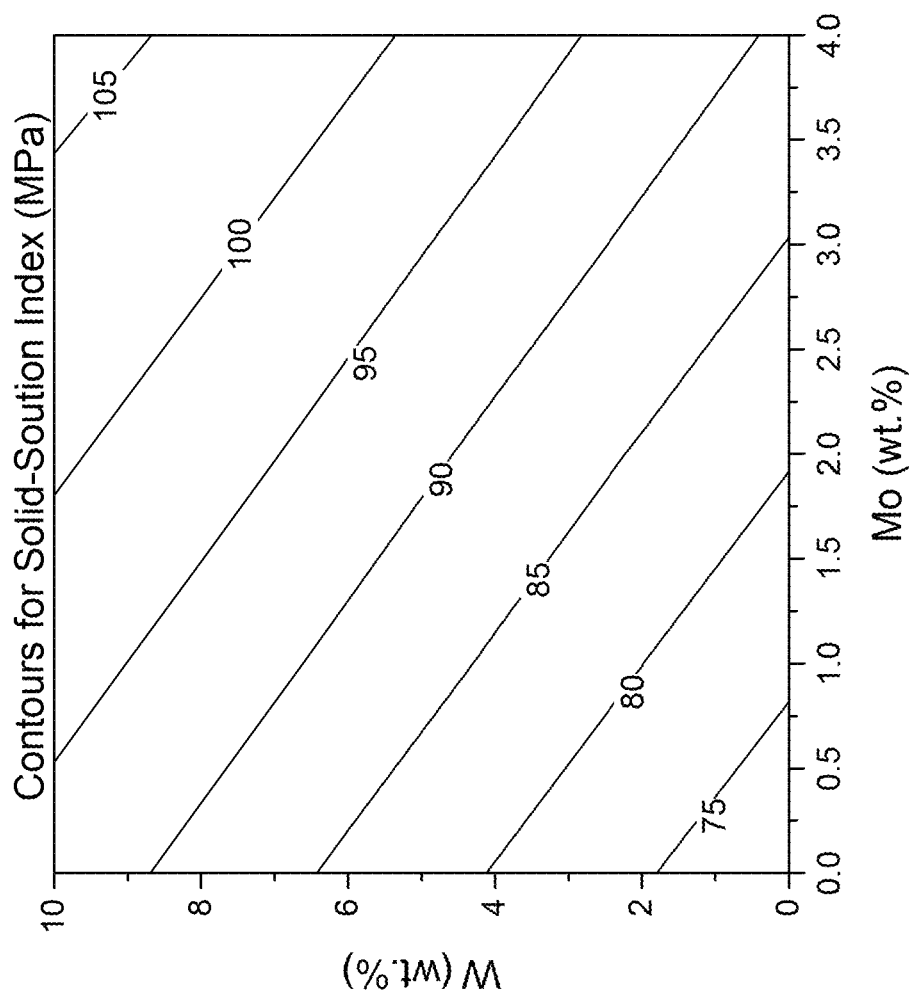
FIG. 5 is a contour plot showing the effect molybdenum and tungsten on solid solution strengthening (in terms of solid solution index), for alloys with the preferred AM index ($M_{Additive-Manufacture} \geq 0$)

The effect of molybdenum and tungsten on the solid solution index is described in FIG. 5. A minimum target for the solid solution index was 90 MPa, more preferably the minimum target was 95 MPa. The change in solid solution index was related to the change in tungsten and molybdenum content according to the formula $$f(\text{SSI})=W_W+2.1W_{Mo}$$

where, f(SSI) is a numerical value, and $W_W$ and $W_{Mo}$ are the weight percent of tungsten and molybdenum in the alloy respectively. Tungsten may be substituted by rhenium and/or ruthenium which changes the equation to $(W_w+0.92 W_{Re}+1.58 W_{Ru})+2.1 W_{Mo}$. For example, in order to produce a value for SSI of at least 90 MPa the numerical value for f(SSI) should be greater than or equal to 8.7. The minimum concentration of Mo+W is limited to 4.2 wt. % to achieve a satisfactory level of SSI. Preferably the numerical value for f(SSI) is greater than or equal to 11.0 to produce an alloy with a value for SSI of at least 95 MPa, equivalent to the highest SSI in Table 3. Therefore it is preferred that the minimum Mo+W content is greater than 5.3 wt. % or even 5.6 wt. %. Given the possibility of rhenium and/or ruthenium substituting tungsten as described below with reference to table 12, tungsten may be substituted by ruthenium and/or rhenium in this equation according to the density ratio of those elements. That is, the equation becomes $(W_w+0.92W_{Re}+1.58W_{Ru})+W_{Mo}$ is 4.2 or greater, preferably 5.3 or greater or even more preferably 5.6 or greater. When the tungsten content is limited to 5.4 wt. % then it is preferred to produce an alloy containing 1.6 wt. % molybdenum or greater to produce an alloy with a SSI of greater than 90 MPa, more it is beneficial to have a molybdenum content of 2.7 wt. % or greater producing an alloy with a SSI of 95 MPa or greater. A minimum amount of tungsten of 0.2 wt. % is therefore desirable as the maximum allowable molybdenum amount is 4.0 wt. %. This means more expensive rhenium and ruthenium are not needed. Desirably the amount of tungsten is at least 0.7 wt. %, or even at least 1.0 wt. % or more, for example 1.5 wt. % or 2.0 wt. % minimum or even 2.6 wt. % minimum. This allows Mo content to be reduced (aiding hot corrosion resistance) as well as little or no reliance on rhenium and ruthenium additions.

Figure 7:
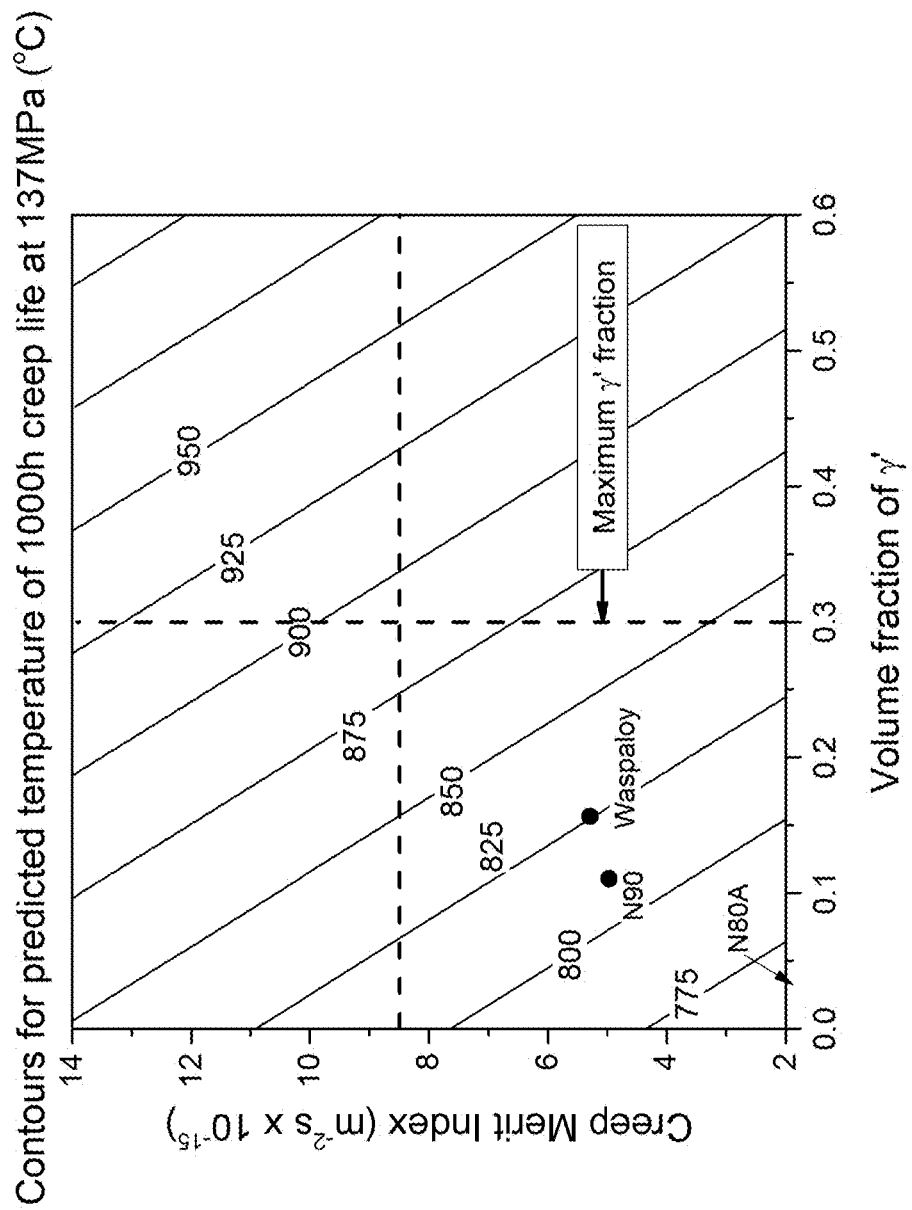
FIG. 7 is a contour plot showing the effect volume fraction of γ' and creep merit index on the predicted 1000 hour creep life at 137 MPa, superimposed are potential limits for volume fraction of γ' and creep merit index within the present invention.
Figure 8:
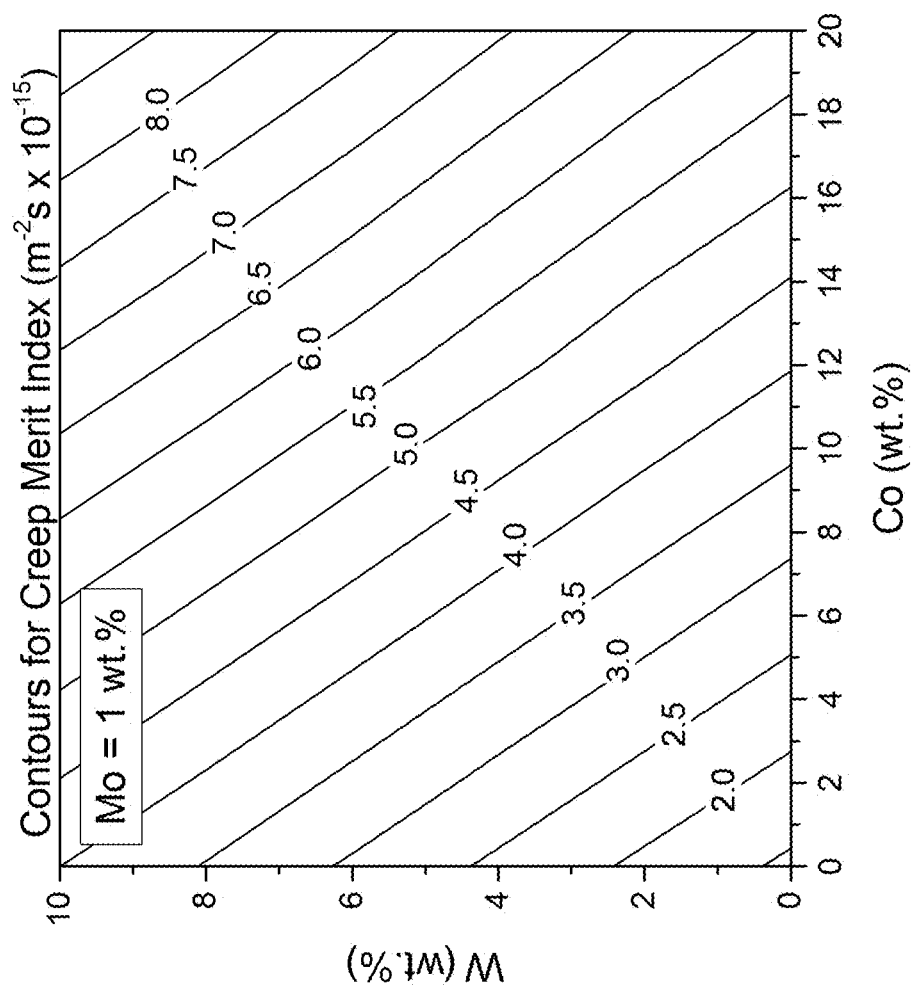
FIG. 8 is a contour plot showing the effect of cobalt and tungsten on creep resistance (in terms of creep merit index) for alloys with the preferred AM index ($M_{Additive-Manufacture} \geq 0$) when molybdenum content is fixed at 1.0 wt. %.

From FIG. 6 it is seen that to produce an alloy which is easily processed by additive manufacturing it is preferable that the γ' volume fraction is limited to 0.30 at an equilibrium temperature of 900° C., most preferably the volume fraction of γ' volume fraction is limited to 0.23 based on the most preferred value AM index $W_{Al}+0.5W_{Ti}+0.3W_{Nb}+0.15W_{Ta} \leq 3.0$. This limit is plotted on FIG. 7. The effect of γ' volume fraction and creep merit index on creep resistance (predicted 1000 hr creep rupture temperature when tested at 137 MPa) is shown in FIG. 7, increasing both parameters will increase creep resistance. The position of the alloys listed in Table 3 which have a positive value for AM index are shown in FIG. 7. To produce an alloy which has an improved creep resistance over Waspaloy it is preferred that the predicted 1000 hr creep rupture life is greater than 850° C. To improve the creep resistance in comparison to Waspaloy it is preferred that the creep merit index is higher than that of Waspaloy $5.3 \times 10^{-15}$ m$^{-2}$s The creep merit index for the alloy system described in Table 2 is limited to $8.5 \times 10^{-15}$ m$^{-2}$s, see FIGS. 8-11. The elemental additions required to achieve a creep merit index of greater than $5.3 \times 10^{-15}$ m$^{-2}$s are reviewed in following section with reference to FIGS. 6 and 8-11. It is also preferred that the γ' volume fraction is higher than that of Waspaloy to produce an alloy with improved creep resistance, preferably the γ' volume fraction in the new alloy is between 0.18 and 0.30, more preferably 0.18 and 0.23 when the equilibrium temperature is 900° C., more preferably for even better combination of creep resistance and AM processing the γ' volume fraction in the new alloy is between 0.20 and 0.23 when the equilibrium temperature is 900° C. This is reviewed with reference to FIG. 6.

If the aluminium, titanium niobium and tantalum content must satisfy the following constraint $$f(\gamma')=W_{Al}+0.5W_{Ti}+0.3W_{Nb}+0.15W_{Ta}$$

where, f(γ') is a numerical value which ranges between 2.65 and 3.5 an alloy with the desired γ' fraction of between 0.18 and 0.3 is produced. If f(γ') is a numerical value which ranges between 2.8 and 3 an alloy with a γ' fraction between 0.20 and 0.23 is produced resulting in an alloy with an improved combination of high creep strength and AM processing. Thus in order to satisfy the constraint for f(γ')—given that $(0.5W_{Ti}+0.3W_{Nb}+0.15W_{Ta})/W_{Al} \leq 1.5$—the minimum aluminium content in the alloy should be 1.0 wt. % To produce an alloy where f(γ') is between 2.8 and 3 producing an alloy with a γ' fraction, between 0.20 and 0.23 the preferred minimum aluminium content should be 1.1 wt. %. As creep resistance can be still further improved by increasing the γ' fraction, desirably f(γ') is 2.9 or greater, thus a minimum aluminium content of 1.2 wt. % is desirable.

Figure 9:
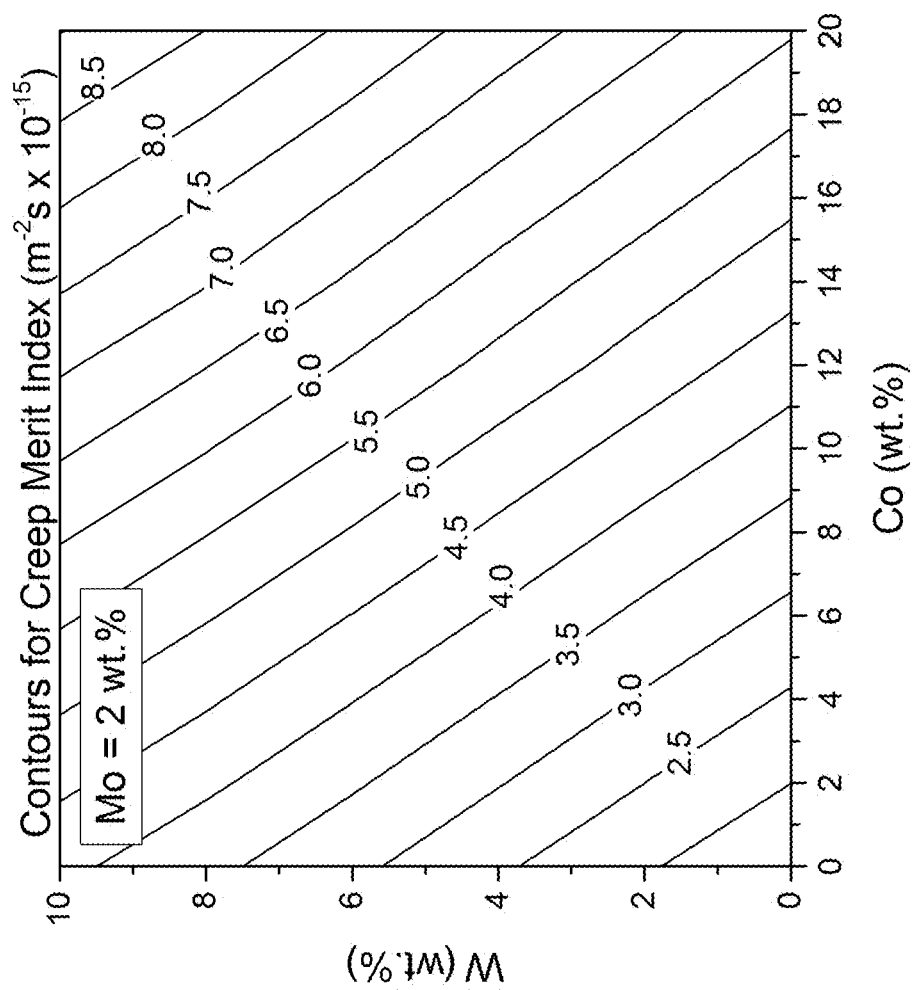
FIG. 9 is a contour plot showing the effect of cobalt and tungsten on creep resistance (in terms of creep merit index) for alloys with the preferred AM index ($M_{Additive-Manufacture} \geq 0$) when molybdenum content is fixed at 2.0 wt. %.
Figure 10:
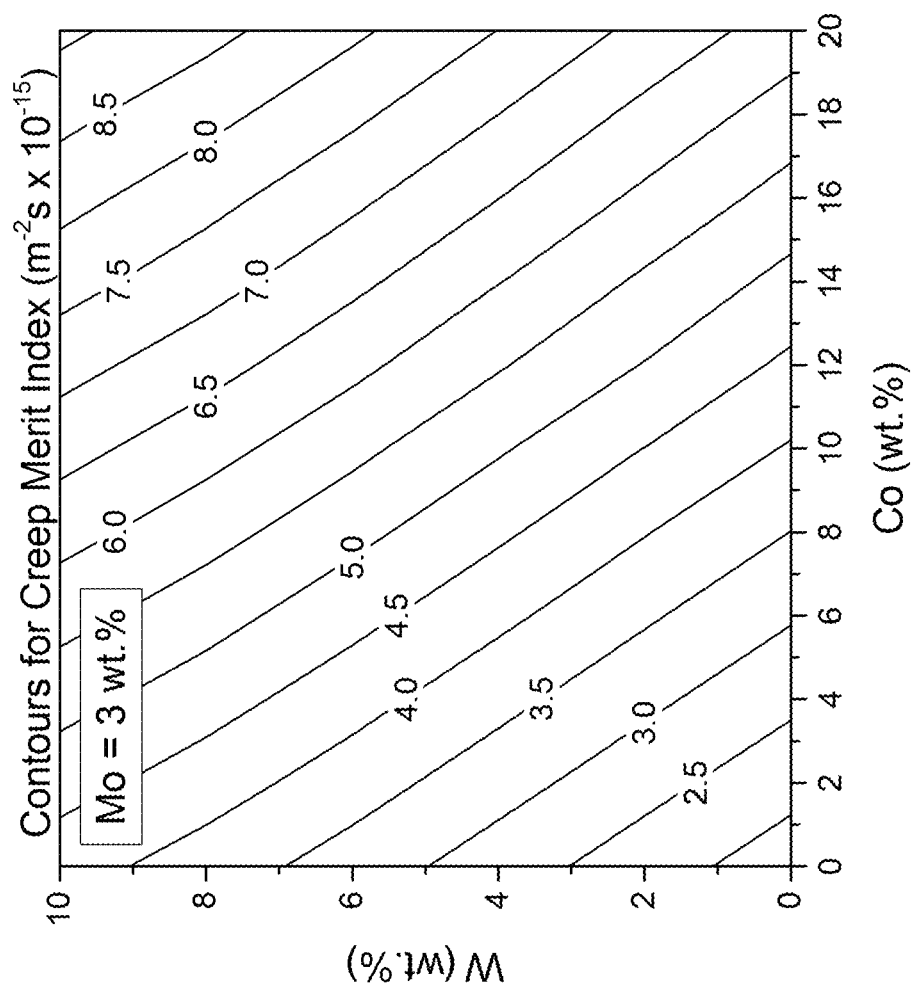
FIG. 10 is a contour plot showing the effect of cobalt and tungsten on creep resistance (in terms of creep merit index) for alloys with the preferred AM index ($M_{Additive-Manufacture} \geq 0$) when molybdenum content is fixed at 3.0 wt. %.
Figure 11:
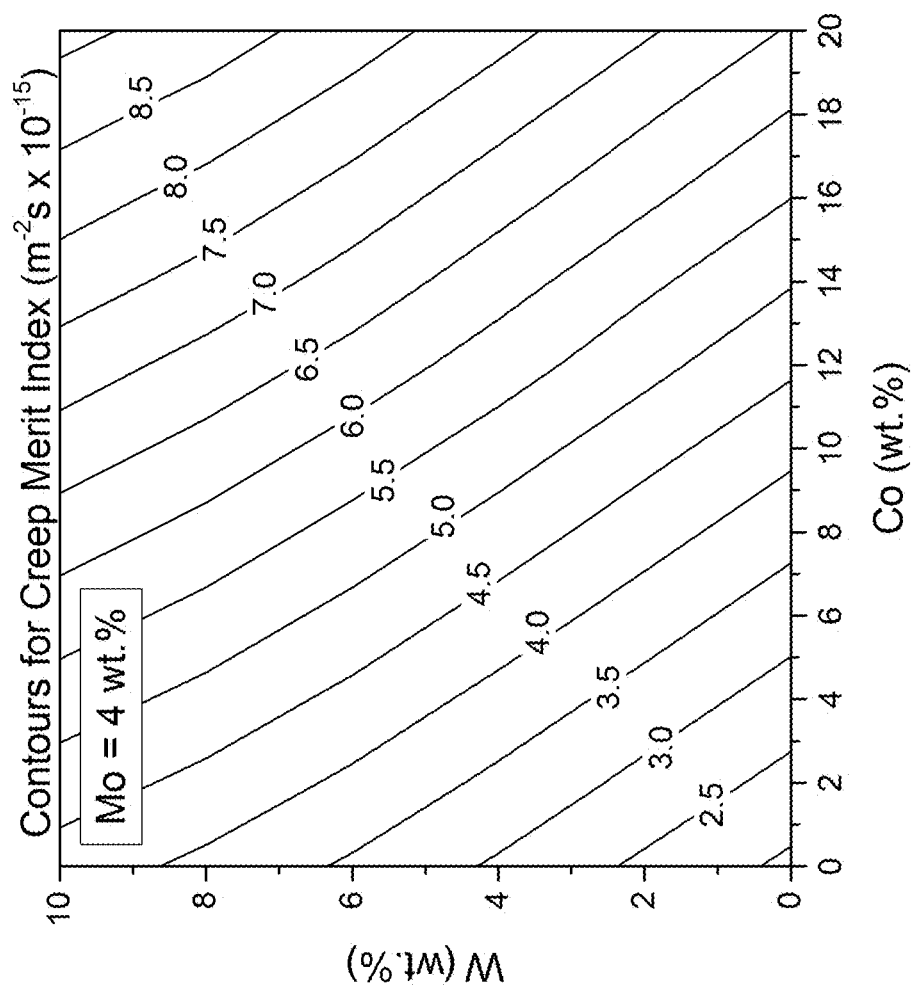
FIG. 11 is a contour plot showing the effect of cobalt and tungsten on creep resistance (in terms of creep merit index) for alloys with the preferred AM index ($M_{Additive-Manufacture} \geq 0$) when molybdenum content is fixed at 4.0 wt. %.
Figure 12:
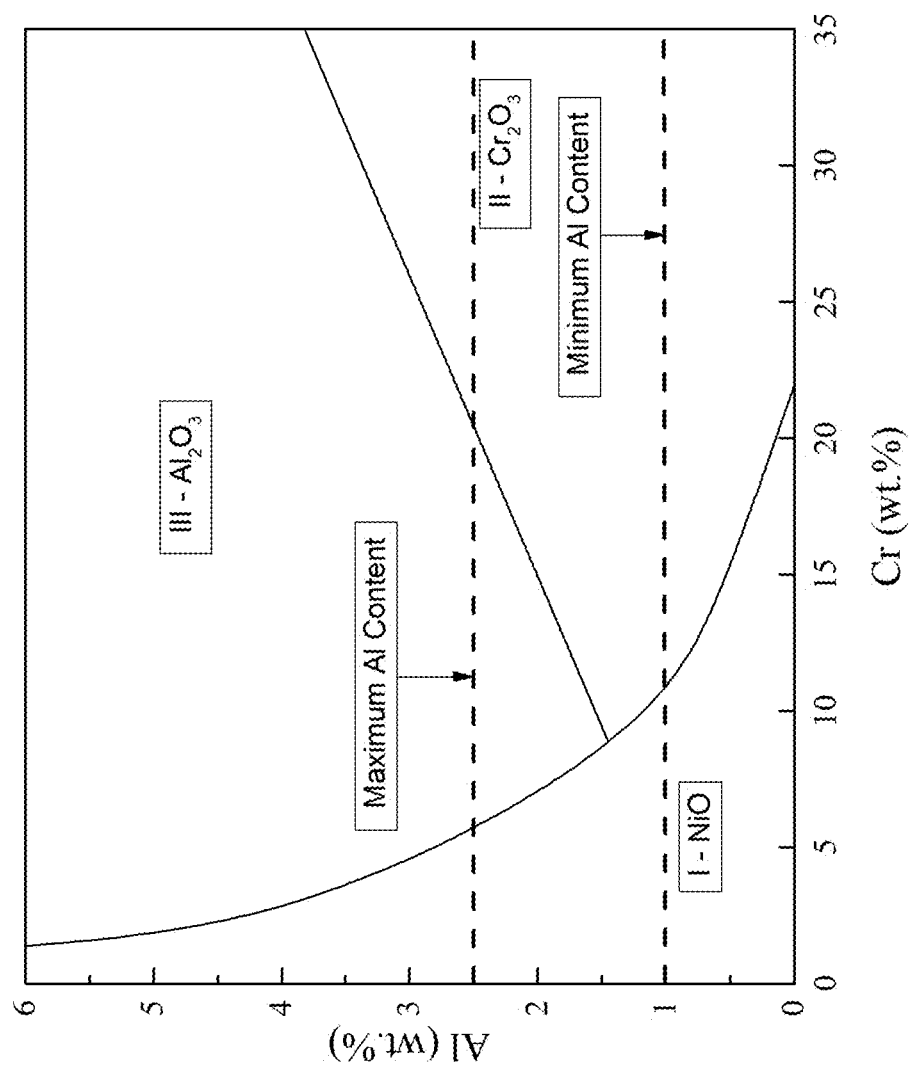
FIG. 12 shows the effect of chromium content and aluminium content on the predominant oxide formed during oxidation, superimposed are the minimum and maximum limits of the aluminium content for the present invention.

The influence of cobalt, tungsten and molybdenum on the creep merit index are presented in FIGS. 8-11. It is seen that these elements have a beneficial influence on improving creep resistance. A target for the creep merit index is $5.3 \times 10^{-15}$ m$^{-2}$s. To produce an alloy with a good balance of density and creep resistance the tungsten content is limited to 5.4 wt. %. The molybdenum content in the alloy is kept below 4.0 wt. % in order to reduce susceptibility to hot corrosion. More preferably the molybdenum content is limited to 3.8 wt. % or less, more preferably to 3.5 wt. % or less, even more preferably to 3.0 wt. % or less, further to improve hot corrosion resistance. FIG. 11 shows the effect of cobalt and tungsten on creep resistance when molybdenum is limited to 4.0 wt. %, this produces the best creep resistance with the preferred molybdenum range. If the tungsten range for density is considered (up to 5.4 wt. %) then a minimum of concentration of cobalt of 8.9 wt. % provides a sufficiently high creep merit index. Higher creep resistance is preferably provided by the alloy containing 14.0 wt. % more cobalt. More preferably the minimum cobalt content in the alloy is 15.6 wt. % as this produces an alloy with a creep merit index of greater than $7.0 \times 10^{-15}$ m$^{-2}$s at 4.0 wt. % molybdenum. This provides a good level of creep resistance when the γ' volume fraction is at the lower preferred limit of 0.20. More preferably the cobalt content is greater than 17.1 wt. % such that a creep merit index of $7.0 \times 10^{-15}$ m$^{-2}$s is achieved for example when molybdenum additions are at the lower end of the preferred limit of 1.6 wt. % (FIG. 9). The maximum concentration of cobalt is limited to 30 wt. % as an alloy where the base element is nickel, excessively high cobalt contents are detrimental to the oxidation performance of the alloy. Preferably the cobalt content is limited to less than 25 wt. % to improve the oxidation behaviour of the alloy, more preferably cobalt additions are limited to less than 20 wt. % due to the high cost of this alloying element (based on raw element costs in 2017). As can be seen from FIGS. 8-11, the higher the tungsten content, the higher the creep merit index. A preferred minimum of 0.2 wt. % tungsten is present. More preferably a creep merit index of $7.0 \times 10^{-15}$ m$^{-2}$s is required, thus a preferred lower limit of tungsten is 1.8 wt. % is present thereby to achieve that creep merit index with 20% cobalt, most preferably the tungsten content should be greater than 3.1 wt. % so that a high creep resistance is achieved in combination with improved resistance to hot corrosion due to the lower levels of molybdenum (FIG. 9).

The elements rhenium, ruthenium and iridium behave in a similar way to that of tungsten i.e. they are gamma forming elements which improve the creep merit index. These elements can optionally be added to the alloy, where the sum of the elements tungsten, rhenium, ruthenium and iridium is less than or equal to an equivalent of 5.4 wt. % tungsten in terms of density. Additions of these elements will significantly increase the creep response of the alloy in comparison to tungsten (as they have much slower diffusivity), however this is achieved with substantial increases in cost due to the high cost of the elements. Based upon the tungsten content to control density (5.4 wt. % or less) the elements can be added to level where they improve creep resistance without increasing alloy density more than the preferred tungsten content. To do this a factor based on the density relative to tungsten is calculated for each alloy. The factor for rhenium, ruthenium and iridium are 0.92, 1.58 and 0.85 respectively. Thus a maximum rhenium content of 5.0 wt. %, ruthenium content of 8.5 wt. % and iridium content of 4.6 wt. % are preferred. More preferably the additions of these elements is limited to less than 3.0% and even more preferably less than 2.0 wt. %, most preferably less than 1.5 wt. % due to their elemental cost.

FIG. 12 provides a map relating alloy composition to the predominant oxide formed at high temperatures. It is necessary for an alloy to form an oxide which is predominantly chromia ($Cr_2O_3$) or alumina ($Al_2O_3$) as these are protective against oxygen ingress which degrades material properties. Additions of chromium are necessary to enable formation of these protective oxides. Based upon the minimum aluminium content of the alloy (1 wt. %) a minimum chromium content of 10.8 wt. % is desirable so that chromia scale is formed even when the aluminium concentration is at the lowest levels (FIG. 12). Most preferably a chromia content of greater than 15.0 wt. % is desired as this has a strong effect in improving oxidation resistance and also provides very good resistance to hot corrosion.

Figure 13:
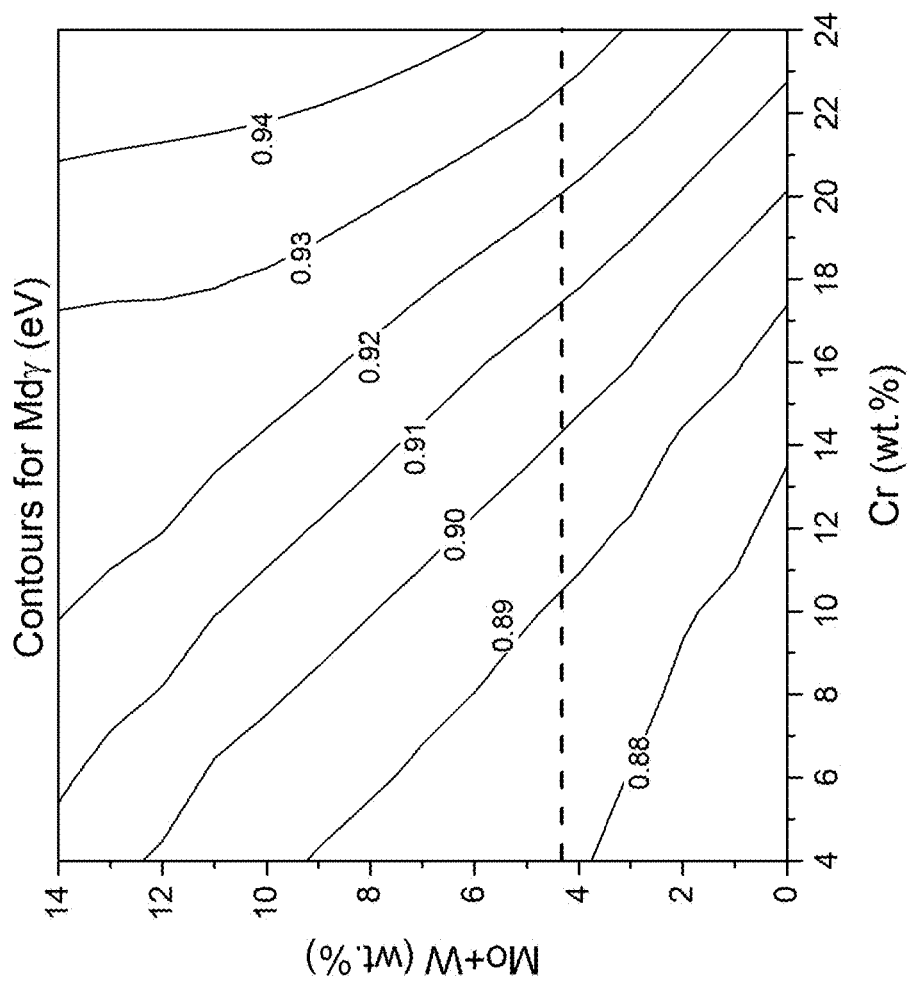
FIG. 13 is a contour plot showing the effect of chromium and the sum of the elements molybdenum and tungsten on the microstructural stability (in terms of the stability number, Md), for alloys with the preferred AM index ($M_{Additive-Manufacture} \geq 0$)

The maximum concentration of chromium is controlled in order to ensure that microstructural stability is maintained and the formation of unwanted topologically close packed (TCP) phases, for example, sigma (σ) or mu (μ) phase. The main elements which lead to the formation of TCP phases are molybdenum, tungsten and chromium. FIG. 13 shows the effect of these elements on the Md number for the gamma matrix phase, a lower Md number is preferred as this provides better microstructural stability. Preferably the Md number is limited to 0.92 so that stability is comparable to other alloys listed in Table 3. Therefore, given the minimum requirement for the sum of the elements molybdenum and tungsten (Mo+W) of 4.2 wt. % a chromium content of less than 20.6 wt. % is beneficial, more preferably less than 19.2 wt. % (based on the preferred Mo+W=5.3 wt. %), more preferably less than 17.6 wt. % as this produces improved stability (Md=0.91) when Mo+W=4.2 wt. %, most preferably below 16.6 wt. % as this results in a stability number of 0.91 (Md=0.91) when Mo+W=5.3 wt. % resulting in the best balance of strength stability and oxidation/corrosion resistance (FIG. 13). Preferably the Mo+W content is less than 10.8 wt. % which achieves good stability (Md=0.91) when chromium levels are equal to 10.8 wt. %, more preferably Mo+W is less than 6.6 wt. % as this results in good stability (Md=0.91) when chromium contents are greater than or equal to 15.0 wt. %.

Additions of carbon, boron and zirconium are required in order to provide strength to grain boundaries. This is particularly beneficial for the creep and fatigue properties of the alloy. The carbon concentrations should range between 0.02 wt. % and 0.35 wt. %. Preferably lower levels of carbon are preferred in order to reduce cracking during the additive manufacturing process, thus a content of less than 0.2 wt. % or less than 0.15 wt % is preferred, more preferably less than 0.1 wt. %. The boron concentration should range between 0.001 and 0.2 wt. %, preferably less than 0.03 wt. % as boron separated to the liquid phase during solidification and may lead to liquation cracking during the AM process, more preferably less than 0.02 wt. %. The zirconium concentrations should range between 0.001 wt. % and 0.5 wt. %, preferably less than 0.01 wt. %, more preferably less than 0.006 wt. %.

It is beneficial that when the alloy is produced, it is substantially free from incidental impurities. These impurities may include the elements sulphur (S), manganese (Mn) and copper (Cu). The element sulphur should remain below 0.003 wt. % (30 PPM in terms of mass). Manganese is an incidental impurity which is limited to 0.25 wt. %, preferably this limited to less than 0.1 wt. %. Copper (Cu) is an incidental impurity which is preferably limited to 0.5 wt. %. The presence of Sulphur above 0.003 wt. %, can lead to embrittlement of the alloy and sulphur also segregates to alloy/oxide interfaces formed during oxidation, preferably sulphur levels of less than less than 0.001 wt. %. Vanadium is an incidental impurity, vanadium negatively influences the oxidation behaviour of the alloy and is which is preferably limited to 0.5 wt. %, preferably less than 0.3 wt. % and most preferably this limited to less than 0.1 wt. %. This segregation may lead to increased spallation of protective oxide scales. If the concentrations of these incidental impurities exceed the specified levels, issues surrounding product yield and deterioration of the material properties of the alloy is expected.

Additions of hafnium (Hf) of up to 0.5 wt. %, or more preferably up to 0.2 wt. % are beneficial for tying up incidental impurities in the alloy and also for providing strength. Hafnium is a strong carbide former it can provide additional grain boundary strengthening.

Additions of the so called 'reactive-elements', Yttrium (Y), Lanthanum (La) and Cerium (Ce) may be beneficial up to levels of 0.1 wt. % to improve the adhesion of protective oxide layers, such as $Cr_2O_3$. These reactive elements can 'mop-up' tramp elements, for example sulphur, which segregates to the alloy oxide interface weakening the bond between oxide and substrate leading to oxide spallation. Additions of Silicon (Si) up to 0.5 wt. % may be beneficial, it has been shown that additions of silicon to nickel based superalloys at levels up to 0.5 wt. % are beneficial for oxidation properties. In particular silicon segregates to the alloy/oxide interface and improves cohesion of the oxide to the substrate. This reduces spallation of the oxide, hence, improving oxidation resistance.

Based upon the description of the invention presented in this section the broad range for the invention is listed in Table 4.

Examples of Invention

Table 4 describes example compositions from the present invention (AMNi-1-AMNi-3). The calculated properties for these new alloys in Table 4 are compared with the currently used alloys in Table 5. The rationale for the design of these alloys is now described.

TABLE 4

Nominal compositions in wt. % of the newly designed additive manufacturing alloys compared with conventional nickel-based superalloys (which have a positive AM index) listed in Table 1.

| Alloy (wt. %) | Ni | Al | Co | Cr | Mo | Nb | Ta | Ti | W | Re | Ru | Fe | C | B | Zr |
|---|---|---|---|---|---|---|---|---|---|---|---|---|---|---|---|
| N80A | 76.70 | 1.40 | 0.00 | 19.50 | 0.00 | 0.00 | 0.00 | 2.40 | 0.00 | 0.00 | 0.00 | 0.00 | 0.06 | 0.003 | 0.06 |
| N90 | 60.00 | 1.50 | 16.50 | 19.50 | 0.00 | 0.00 | 0.00 | 2.50 | 0.00 | 0.00 | 0.00 | 0.00 | 0.07 | 0.003 | 0.06 |
| Waspaloy | 58.40 | 1.30 | 13.50 | 19.50 | 4.30 | 0.00 | 0.00 | 3.00 | 0.00 | 0.00 | 0.00 | 0.00 | 0.08 | 0.006 | 0.00 |
| AMNi-1 | 51.00 | 1.50 | 18.00 | 19.50 | 3.00 | 0.00 | 1.50 | 2.50 | 3.00 | 0.00 | 0.00 | 0.00 | 0.100 | 0.010 | 0.001 |
| AMNi-2 | 50.70 | 1.50 | 18.00 | 19.50 | 2.50 | 0.30 | 1.00 | 2.50 | 4.00 | 0.00 | 0.00 | 0.00 | 0.100 | 0.010 | 0.001 |
| AMNi-3 | 50.50 | 1.50 | 18.00 | 19.50 | 2.00 | 0.50 | 0.50 | 2.50 | 5.00 | 0.00 | 0.00 | 0.00 | 0.100 | 0.010 | 0.001 |

TABLE 5

Calculated phase fractions and merit indices made with the "Alloys-by-Design" software. Results for conventional nickel-based superalloys (which have a positive AM index) and the nominal composition of the new alloys (Table 4).

| Alloy | Phase Fractions $\gamma'$ | $Md_\gamma$ | Creep Merit Index ($m^{-2}s \times 10^{-15}$) | Density ($g/cm^3$) | Cost (£/g) | $\gamma/\gamma'$ Misfit (%) | $\gamma'$ Solvus (° C.) | Strength Merit Index (Mpa) | AM Index | $W_{Al} + 0.5W_{Ti} + 1.5(0.3W_{Nb} + 0.15W_{Ta})$ |
|---|---|---|---|---|---|---|---|---|---|---|
| N80A | 2.87% | 0.880 | 1.57 | 8.48 | 18.39 | 0.58% | 921 | 371 | 0.40 | 2.60 |
| N90 | 11.08% | 0.880 | 4.97 | 8.46 | 26.62 | 0.66% | 993 | 782 | 0.25 | 2.75 |
| Waspaloy | 15.69% | 0.901 | 5.30 | 8.50 | 26.61 | 0.36% | 1028 | 985 | 0.20 | 2.80 |
| AMNi-1 | 18.17% | 0.912 | 7.08 | 8.67 | 30.37 | 0.32% | 1039 | 1077 | 0.03 | 3.09 |
| AMNi-2 | 18.74% | 0.912 | 7.29 | 8.69 | 29.83 | 0.34% | 1046 | 1094 | 0.01 | 3.11 |
| AMNi-3 | 18.89% | 0.912 | 7.47 | 8.71 | 29.27 | 0.34% | 1050 | 1091 | 0.03 | 3.09 |

The examples alloys AMNi-1-AMNi-3 which are included in this invention have an improved balance of mechanical properties (tensile strength and creep strength) in comparison to current alloys which have an AM index which is calculated to be positive. The result is an improved combination of mechanical strength and ability to process using additive manufacturing in comparison to known alloys listed (N80A, N90, Waspaloy). In particular, tensile strength (in terms of strength merit index) is improved by between 93-109 MPa (compared to the Waspaloy), a percentage improvement of between 8.5-10%. Moreover, the creep resistance of the alloy is improved with respect to Waspaloy, by increasing the creep merit index as-well-as increasing the $\gamma'$ volume fraction (FIG. 7). The combination of increased $\gamma'$ volume fraction and creep merit index result in an improvement in creep rupture life of 25° C. in comparison to Waspaloy (FIG. 7). These improvement are achieved with other alloy properties, for example cost and density which closely equivalent to the known alloys (N80A, N90, Waspaloy).

TABLE 6

Example compositions where the ratio of elements has according to the relationship $(0.5W_{Ti} + 0.3W_{Nb} + 0.15W_{Ta})/W_{Al}$ has been modified for example alloy AMNi-3.

| Alloy (wt. %) | Ni | Al | Co | Cr | Mo | Nb | Ta | Ti | W | Re | Ru | Fe | C | B | Zr |
|---|---|---|---|---|---|---|---|---|---|---|---|---|---|---|---|
| AMNi-3 | 50.50 | 1.50 | 18.00 | 19.50 | 2.00 | 0.50 | 0.50 | 2.50 | 5.00 | 0.00 | 0.00 | 0.00 | 0.100 | 0.010 | 0.001 |
| AMNi-4 | 50.20 | 1.40 | 18.00 | 19.50 | 2.00 | 0.61 | 0.72 | 2.57 | 5.00 | 0.00 | 0.00 | 0.00 | 0.100 | 0.010 | 0.001 |
| AMNi-5 | 49.91 | 1.30 | 18.00 | 19.50 | 2.00 | 0.72 | 0.94 | 2.63 | 5.00 | 0.00 | 0.00 | 0.00 | 0.100 | 0.010 | 0.001 |
| AMNi-6 | 49.60 | 1.20 | 18.00 | 19.50 | 2.00 | 0.83 | 1.17 | 2.70 | 5.00 | 0.00 | 0.00 | 0.00 | 0.100 | 0.010 | 0.001 |
| AMNi-7 | 49.30 | 1.10 | 18.00 | 19.50 | 2.00 | 0.94 | 1.39 | 2.77 | 5.00 | 0.00 | 0.00 | 0.00 | 0.100 | 0.010 | 0.001 |
| AMNi-8 | 49.00 | 1.00 | 18.00 | 19.50 | 2.00 | 1.06 | 1.61 | 2.83 | 5.00 | 0.00 | 0.00 | 0.00 | 0.100 | 0.010 | 0.001 |

TABLE 7

Calculated phase fractions and merit indices made with the "Alloys-by-Design" software. Results for compositions where the ratio of elements has according to the relationship $(0.5W_{Ti} + 0.3W_{Nb} + 0.15W_{Ta})/W_{Al}$ has been modified for example alloy AMNi-3 (Table 6).

| Alloy | Phase Fractions $\gamma'$ | $\eta$ | $Md_\gamma$ | Creep Merit Index ($m^{-2}s \times 10^{-15}$) | Density ($g/cm^3$) | Cost (£/g) | $\gamma/\gamma'$ Misfit (%) | $\gamma'$ Solvus (° C.) | Strength Merit Index (Mpa) | AM Index | $W_{Al} + 0.5W_{Ti} + 1.5(0.3W_{Nb} + 0.15W_{Ta})$ |
|---|---|---|---|---|---|---|---|---|---|---|---|
| AMNi-3 | 18.89% | 0.00% | 0.912 | 7.47 | 8.71 | 29.27 | 0.34% | 1050 | 1091 | 0.03 | 3.09 |
| AMNi-4 | 19.33% | 0.08% | 0.912 | 7.52 | 8.73 | 29.55 | 0.38% | 1051 | 1136 | 0.02 | 3.12 |
| AMNi-5 | 19.61% | 3.64% | 0.913 | 7.57 | 8.75 | 29.84 | 0.42% | 1051 | 1176 | 0.03 | 3.15 |
| AMNi-6 | 19.89% | 7.33% | 0.914 | 7.61 | 8.77 | 30.13 | 0.46% | 1050 | 1217 | 0.03 | 3.19 |

TABLE 7-continued

Calculated phase fractions and merit indices made with the "Alloys-by-Design" software.
Results for compositions where the ratio of elements has according to the relationship
$(0.5W_{Ti} + 0.3W_{Nb} + 0.15W_{Ta})/W_{Al}$ has been modified for example alloy AMNi-3 (Table 6).

| Alloy | Phase Fractions γ' | η | $Md_\gamma$ | Creep Merit Index $(m^{-2}s \times 10^{-15})$ | Density $(g/cm^3)$ | Cost (£/g) | γ/γ' Misfit (%) | γ' Solvus (°C.) | Strength Merit Index (Mpa) | AM Index | $W_{Al} + 0.5W_{Ti} + 1.5(0.3W_{Nb} + 0.15W_{Ta})$ |
|---|---|---|---|---|---|---|---|---|---|---|---|
| AMNi-7 | 20.06% | 11.07% | 0.915 | 7.65 | 8.80 | 30.42 | 0.50% | 1050 | 1255 | 0.02 | 3.22 |
| AMNi-8 | 20.10% | 14.87% | 0.916 | 7.67 | 8.82 | 30.70 | 0.53% | 1049 | 1288 | 0.03 | 3.25 |

Table 6 describes example compositions where the ratio of the elements according to the relationship $(0.5W_{Ti}+0.3W_{Nb}+0.15W_{Ta})$ $W_{Al}$ has been modified between 0.98 and 1.98. The calculated properties for these alloys—demonstrating the effect of this ratio—are listed in Table 7. In comparison to the baseline alloy AMNi-3 it is seen that increasing the ratio increases tensile strength (in terms of strength merit index), this is achieved with only small difference in other properties such as density and cost. Increasing the ratio $(0.5W_{Ti}+0.3W_{Nb}+0.15W_{Ta})$ $W_{Al}$ can lead to formation of unwanted phases (ε) which can undesirably reduce alloy ductility. Low levels of ε phase of less than 5% can be tolerated. Alloy AMNi-6 where $(0.5W_{Ti}+0.3W_{Nb}+0.15W_{Ta})/W_{Al}=1.48$ has an ε phase fraction beyond this limit demonstrating that restricting the ratio to less than 1.5 is beneficial. Alloy AMNi-5 where $(0.5W_{Ti}+0.3W_{Nb}+0.15W_{Ta})$ $W_{Al}=1.28$ has an δ phase fraction of less than 5%, more preferably Alloy AMNi-4 where $(0.5W_{Ti}+0.3W_{Nb}+0.15W_{Ta})$ $W_{Al}=1.125$ shows very limited formation of δ phase whilst showing an improvement in strength relative to baseline alloy AMNi-3.

TABLE 8

Example compositions where the cobalt content has been modified
between 11.5 to 29.5 wt. % in example alloy AMNi-3.

| Alloy (wt. %) | Ni | Al | Co | Cr | Mo | Nb | Ta | Ti | W | Re | Ru | Fe | C | B | Zr |
|---|---|---|---|---|---|---|---|---|---|---|---|---|---|---|---|
| AMNi-3 | 50.50 | 1.50 | 18.00 | 19.50 | 2.00 | 0.50 | 0.50 | 2.50 | 5.00 | 0.00 | 0.00 | 0.00 | 0.100 | 0.010 | 0.001 |
| AMNi-9 | 57.00 | 1.50 | 11.50 | 19.50 | 2.00 | 0.50 | 0.50 | 2.50 | 5.00 | 0.00 | 0.00 | 0.00 | 0.100 | 0.010 | 0.001 |
| AMNi-10 | 55.00 | 1.50 | 13.50 | 19.50 | 2.00 | 0.50 | 0.50 | 2.50 | 5.00 | 0.00 | 0.00 | 0.00 | 0.100 | 0.010 | 0.001 |
| AMNi-11 | 53.00 | 1.50 | 15.50 | 19.50 | 2.00 | 0.50 | 0.50 | 2.50 | 5.00 | 0.00 | 0.00 | 0.00 | 0.100 | 0.010 | 0.001 |
| AMNi-12 | 51.00 | 1.50 | 17.50 | 19.50 | 2.00 | 0.50 | 0.50 | 2.50 | 5.00 | 0.00 | 0.00 | 0.00 | 0.100 | 0.010 | 0.001 |
| AMNi-13 | 49.00 | 1.50 | 19.50 | 19.50 | 2.00 | 0.50 | 0.50 | 2.50 | 5.00 | 0.00 | 0.00 | 0.00 | 0.100 | 0.010 | 0.001 |
| AMNi-14 | 47.00 | 1.50 | 21.50 | 19.50 | 2.00 | 0.50 | 0.50 | 2.50 | 5.00 | 0.00 | 0.00 | 0.00 | 0.100 | 0.010 | 0.001 |
| AMNi-15 | 45.00 | 1.50 | 23.50 | 19.50 | 2.00 | 0.50 | 0.50 | 2.50 | 5.00 | 0.00 | 0.00 | 0.00 | 0.100 | 0.010 | 0.001 |
| AMNi-16 | 43.00 | 1.50 | 25.50 | 19.50 | 2.00 | 0.50 | 0.50 | 2.50 | 5.00 | 0.00 | 0.00 | 0.00 | 0.100 | 0.010 | 0.001 |
| AMNi-17 | 41.00 | 1.50 | 27.50 | 19.50 | 2.00 | 0.50 | 0.50 | 2.50 | 5.00 | 0.00 | 0.00 | 0.00 | 0.100 | 0.010 | 0.001 |
| AMNi-18 | 39.00 | 1.50 | 29.50 | 19.50 | 2.00 | 0.50 | 0.50 | 2.50 | 5.00 | 0.00 | 0.00 | 0.00 | 0.100 | 0.010 | 0.001 |

TABLE 9

Calculated phase fractions and merit indices made with the "Alloys-by-Design" software.
Results for compositions where the cobalt content has been modified
between 11.5 and 29.5 wt. % in example alloy AMNi-3 (Table 8).

| Alloy | Phase Fractions γ' | $Md_\gamma$ | Creep Merit Index $(m^{-2}s \times 10^{-15})$ | Density $(g/cm^3)$ | Cost (£/g) | γ/γ' Misfit (%) | γ' Solvus (°C.) | Strength Merit Index (Mpa) | AM Index | $W_{Al} + 0.5W_{Ti} + 1.5(0.3W_{Nb} + 0.15W_{Ta})$ |
|---|---|---|---|---|---|---|---|---|---|---|
| AMNi-3 | 18.89% | 0.912 | 7.47 | 8.71 | 29.27 | 0.34% | 1050 | 1091 | 0.03 | 3.09 |
| AMNi-9 | 17.69% | 0.910 | 5.98 | 8.71 | 26.02 | 0.34% | 1032 | 1042 | 0.03 | 3.09 |
| AMNi-10 | 18.15% | 0.911 | 6.44 | 8.71 | 27.02 | 0.34% | 1038 | 1060 | 0.03 | 3.09 |
| AMNi-11 | 18.53% | 0.911 | 6.90 | 8.71 | 28.02 | 0.34% | 1044 | 1076 | 0.03 | 3.09 |
| AMNi-12 | 18.83% | 0.912 | 7.35 | 8.71 | 29.02 | 0.34% | 1048 | 1088 | 0.03 | 3.09 |
| AMNi-13 | 19.06% | 0.913 | 7.81 | 8.71 | 30.02 | 0.34% | 1053 | 1098 | 0.03 | 3.09 |
| AMNi-14 | 19.22% | 0.913 | 8.25 | 8.71 | 31.02 | 0.33% | 1056 | 1106 | 0.03 | 3.09 |
| AMNi-15 | 19.31% | 0.914 | 8.69 | 8.71 | 32.02 | 0.33% | 1059 | 1112 | 0.03 | 3.09 |
| AMNi-16 | 19.35% | 0.915 | 9.13 | 8.71 | 33.02 | 0.32% | 1061 | 1116 | 0.03 | 3.09 |
| AMNi-17 | 19.32% | 0.917 | 9.56 | 8.71 | 34.02 | 0.31% | 1062 | 1118 | 0.03 | 3.09 |
| AMNi-18 | 19.23% | 0.918 | 9.98 | 8.71 | 35.02 | 0.30% | 1062 | 1118 | 0.03 | 3.09 |

Table 8 describes example compositions where the cobalt content in Alloy AMNi-3 has been modified between 11.5 and 29.5 wt. %. The calculated properties for these alloys—demonstrating the effect of cobalt—are listed in Table 9. In comparison to the baseline alloy AMNi-3 it is seen that reducing the cobalt content (AMNi-10-AMNi-12) will decrease the creep resistance (in terms of creep merit index). However, the target for creep merit index is still achieved. When cobalt is lowered, there is limited change in other properties such as γ' volume fraction or tensile strength (in terms of strength merit index). The lowering of cobalt is also advantageous for lowering alloy cost and increasing stability by lowering Md number. Increasing the cobalt content in comparison to the baseline alloy AMNi-3 (AMNi-13-AMNi-18) increased the creep merit index providing an improvement in creep resistance. There is limited impact on γ' volume fraction or tensile strength. Increasing cobalt increases alloy cost. At a level of 29.5 wt. % the alloy approaches the stability limit (Md≤0.92). Thus it is preferable to keep the cobalt content to less than 29.5 wt. % to control alloy cost and stability.

TABLE 10

Example compositions where the chromium content has been modified between 9.0 to 23.0 wt. % in example alloy AMNi-3.

| Alloy (wt. %) | Ni | Al | Co | Cr | Mo | Nb | Ta | Ti | W | Re | Ru | Fe | C | B | Zr |
|---|---|---|---|---|---|---|---|---|---|---|---|---|---|---|---|
| AMNi-3 | 50.50 | 1.50 | 18.00 | 19.50 | 2.00 | 0.50 | 0.50 | 2.50 | 5.00 | 0.00 | 0.00 | 0.00 | 0.100 | 0.010 | 0.001 |
| AMNi-19 | 59.50 | 1.50 | 19.50 | 9.00 | 2.00 | 0.50 | 0.50 | 2.50 | 5.00 | 0.00 | 0.00 | 0.00 | 0.100 | 0.010 | 0.001 |
| AMNi-20 | 57.50 | 1.50 | 19.50 | 11.00 | 2.00 | 0.50 | 0.50 | 2.50 | 5.00 | 0.00 | 0.00 | 0.00 | 0.100 | 0.010 | 0.001 |
| AMNi-21 | 55.50 | 1.50 | 19.50 | 13.00 | 2.00 | 0.50 | 0.50 | 2.50 | 5.00 | 0.00 | 0.00 | 0.00 | 0.100 | 0.010 | 0.001 |
| AMNi-22 | 53.50 | 1.50 | 19.50 | 15.00 | 2.00 | 0.50 | 0.50 | 2.50 | 5.00 | 0.00 | 0.00 | 0.00 | 0.100 | 0.010 | 0.001 |
| AMNi-23 | 51.50 | 1.50 | 19.50 | 17.00 | 2.00 | 0.50 | 0.50 | 2.50 | 5.00 | 0.00 | 0.00 | 0.00 | 0.100 | 0.010 | 0.001 |
| AMNi-24 | 49.50 | 1.50 | 19.50 | 19.00 | 2.00 | 0.50 | 0.50 | 2.50 | 5.00 | 0.00 | 0.00 | 0.00 | 0.100 | 0.010 | 0.001 |
| AMNi-25 | 47.50 | 1.50 | 19.50 | 21.00 | 2.00 | 0.50 | 0.50 | 2.50 | 5.00 | 0.00 | 0.00 | 0.00 | 0.100 | 0.010 | 0.001 |
| AMNi-26 | 45.50 | 1.50 | 19.50 | 23.00 | 2.00 | 0.50 | 0.50 | 2.50 | 5.00 | 0.00 | 0.00 | 0.00 | 0.100 | 0.010 | 0.001 |

TABLE 11

Calculated phase fractions and merit indices made with the "Alloys-by-Design" software. Results for compositions where the chromium content has been modified between 9.0 to 23.0 wt. % in example alloy AMNi-3 (Table 10).

| Alloy | Phase Fractions γ' | $Md_\gamma$ | Creep Merit Index ($m^{-2}s \times 10^{-15}$) | Density ($g/cm^3$) | Cost (£/g) | γ/γ' Misfit (%) | γ' Solvus (° C.) | Strength Merit Index (Mpa) | AM Index | $W_{Al} + 0.5W_{Ti} + 1.5(0.3W_{Nb} + 0.15W_{Ta})$ |
|---|---|---|---|---|---|---|---|---|---|---|
| AMNi-3 | 18.89% | 0.912 | 7.47 | 8.71 | 29.27 | 0.34% | 1050 | 1091 | 0.03 | 3.09 |
| AMNi-19 | 17.87% | 0.882 | 6.56 | 8.91 | 29.90 | 0.49% | 1042 | 1052 | 0.03 | 3.09 |
| AMNi-20 | 18.33% | 0.885 | 6.82 | 8.87 | 29.78 | 0.48% | 1048 | 1071 | 0.03 | 3.09 |
| AMNi-21 | 18.71% | 0.890 | 7.08 | 8.83 | 29.66 | 0.46% | 1054 | 1086 | 0.03 | 3.09 |
| AMNi-22 | 19.02% | 0.896 | 7.32 | 8.79 | 29.54 | 0.43% | 1059 | 1099 | 0.03 | 3.09 |
| AMNi-23 | 19.25% | 0.903 | 7.55 | 8.76 | 29.42 | 0.39% | 1063 | 1109 | 0.03 | 3.09 |
| AMNi-24 | 19.41% | 0.910 | 7.76 | 8.72 | 29.30 | 0.35% | 1067 | 1117 | 0.03 | 3.09 |
| AMNi-25 | 19.51% | 0.919 | 7.95 | 8.68 | 29.18 | 0.30% | 1069 | 1123 | 0.03 | 3.09 |
| AMNi-26 | 19.54% | 0.928 | 8.14 | 8.64 | 29.06 | 0.24% | 1071 | 1127 | 0.03 | 3.09 |

Table 10 describes example compositions where the chromium content in Alloy AMNi-3 has been modified between 9.0 and 23.0 wt. %. The calculated properties for these alloys—demonstrating the effect of chromium—are listed in Table 11. In comparison to the baseline alloy AMNi-3 it is seen that reducing the chromium content (AMNi-19 AMNi-24) will improve alloy microstructural stability (in terms of a reduced Md number). The effect of lowering chromium will result in a reduction in oxidation resistance as higher levels of chromium promote more protective oxides. When chromium is lowered, there is limited change in other properties such as γ' volume fraction or tensile strength (in terms of strength merit index). Increasing the chromium content in comparison to the baseline alloy AMNi-3 (AMNi-25-AMNi-26) provides an improvement in oxidation resistance. There is limited impact on γ' volume fraction or tensile strength. Increasing chromium beyond a level of 21.0 wt. % pushed the alloy beyond the stability limit (Md≤0.92). Thus it is preferable to keep the cobalt content to less than 21.0 wt. % to control alloy cost and stability. More preferable a chromium range between 15.0-19.5 wt. % provides the best balance of oxidation resistance and microstructural stability.

TABLE 12

Example compositions where rhenium and ruthenium have been substituted for tungsten between 0.46 to 4.6 wt. % and 0.79 and 7.9 wt. % respectively in example alloy AMNi-3.

| Alloy (wt. %) | Ni | Al | Co | Cr | Mo | Nb | Ta | Ti | W | Re | Ru | Fe | C | B | Zr |
|---|---|---|---|---|---|---|---|---|---|---|---|---|---|---|---|
| AMNi-3 | 50.50 | 1.50 | 18.00 | 19.50 | 2.00 | 0.50 | 0.50 | 2.50 | 5.00 | 0.00 | 0.00 | 0.00 | 0.100 | 0.010 | 0.001 |
| AMNi-27 | 49.04 | 1.50 | 19.50 | 19.50 | 2.00 | 0.50 | 0.50 | 2.50 | 4.50 | 0.46 | 0.00 | 0.00 | 0.100 | 0.010 | 0.001 |
| AMNi-28 | 49.08 | 1.50 | 19.50 | 19.50 | 2.00 | 0.50 | 0.50 | 2.50 | 4.00 | 0.92 | 0.00 | 0.00 | 0.100 | 0.010 | 0.001 |
| AMNi-29 | 49.12 | 1.50 | 19.50 | 19.50 | 2.00 | 0.50 | 0.50 | 2.50 | 3.50 | 1.38 | 0.00 | 0.00 | 0.100 | 0.010 | 0.001 |
| AMNi-30 | 49.16 | 1.50 | 19.50 | 19.50 | 2.00 | 0.50 | 0.50 | 2.50 | 3.00 | 1.84 | 0.00 | 0.00 | 0.100 | 0.010 | 0.001 |
| AMNi-31 | 49.20 | 1.50 | 19.50 | 19.50 | 2.00 | 0.50 | 0.50 | 2.50 | 2.50 | 2.30 | 0.00 | 0.00 | 0.100 | 0.010 | 0.001 |
| AMNi-32 | 49.24 | 1.50 | 19.50 | 19.50 | 2.00 | 0.50 | 0.50 | 2.50 | 2.00 | 2.76 | 0.00 | 0.00 | 0.100 | 0.010 | 0.001 |
| AMNi-33 | 49.28 | 1.50 | 19.50 | 19.50 | 2.00 | 0.50 | 0.50 | 2.50 | 1.50 | 3.22 | 0.00 | 0.00 | 0.100 | 0.010 | 0.001 |
| AMNi-34 | 49.32 | 1.50 | 19.50 | 19.50 | 2.00 | 0.50 | 0.50 | 2.50 | 1.00 | 3.68 | 0.00 | 0.00 | 0.100 | 0.010 | 0.001 |
| AMNi-33 | 49.36 | 1.50 | 19.50 | 19.50 | 2.00 | 0.50 | 0.50 | 2.50 | 0.50 | 4.14 | 0.00 | 0.00 | 0.100 | 0.010 | 0.001 |
| AMNi-36 | 49.40 | 1.50 | 19.50 | 19.50 | 2.00 | 0.50 | 0.50 | 2.50 | 0.00 | 4.60 | 0.00 | 0.00 | 0.100 | 0.010 | 0.001 |
| AMNi-37 | 48.71 | 1.50 | 19.50 | 19.50 | 2.00 | 0.50 | 0.50 | 2.50 | 4.50 | 0.00 | 0.79 | 0.00 | 0.100 | 0.010 | 0.001 |
| AMNi-38 | 48.42 | 1.50 | 19.50 | 19.50 | 2.00 | 0.50 | 0.50 | 2.50 | 4.00 | 0.00 | 1.58 | 0.00 | 0.100 | 0.010 | 0.001 |
| AMNi-39 | 48.13 | 1.50 | 19.50 | 19.50 | 2.00 | 0.50 | 0.50 | 2.50 | 3.50 | 0.00 | 2.37 | 0.00 | 0.100 | 0.010 | 0.001 |
| AMNi-40 | 47.84 | 1.50 | 19.50 | 19.50 | 2.00 | 0.50 | 0.50 | 2.50 | 3.00 | 0.00 | 3.16 | 0.00 | 0.100 | 0.010 | 0.001 |
| AMNi-41 | 47.55 | 1.50 | 19.50 | 19.50 | 2.00 | 0.50 | 0.50 | 2.50 | 2.50 | 0.00 | 3.95 | 0.00 | 0.100 | 0.010 | 0.001 |
| AMNi-42 | 47.26 | 1.50 | 19.50 | 19.50 | 2.00 | 0.50 | 0.50 | 2.50 | 2.00 | 0.00 | 4.74 | 0.00 | 0.100 | 0.010 | 0.001 |
| AMNi-43 | 46.97 | 1.50 | 19.50 | 19.50 | 2.00 | 0.50 | 0.50 | 2.50 | 1.50 | 0.00 | 5.53 | 0.00 | 0.100 | 0.010 | 0.001 |
| AMNi-44 | 46.68 | 1.50 | 19.50 | 19.50 | 2.00 | 0.50 | 0.50 | 2.50 | 1.00 | 0.00 | 6.32 | 0.00 | 0.100 | 0.010 | 0.001 |
| AMNi-45 | 46.39 | 1.50 | 19.50 | 19.50 | 2.00 | 0.50 | 0.50 | 2.50 | 0.50 | 0.00 | 7.11 | 0.00 | 0.100 | 0.010 | 0.001 |
| AMNi-46 | 46.10 | 1.50 | 19.50 | 19.50 | 2.00 | 0.50 | 0.50 | 2.50 | 0.00 | 0.00 | 7.90 | 0.00 | 0.100 | 0.010 | 0.001 |

TABLE 13

Calculated phase fractions and merit indices made with the "Alloys-by-Design" software. Results for compositions where rhenium and ruthenium have been substituted for tungsten between 0.46 to 4.6 wt. % and 0.79 and 7.9 wt. % respectively in example alloy AMNi-3 (Table 12).

| Alloy | Phase Fractions γ' | $Md_\gamma$ | Creep Merit Index ($m^{-2}s \times 10^{-15}$) | Density (g/cm$^3$) | Cost (£/g) | γ/γ' Misfit (%) | γ' Solvus (° C.) | Strength Merit Index (Mpa) | AM Index | $W_{Al} + 0.5W_{Ti} + 1.5(0.3W_{Nb} + 0.15W_{Ta})$ |
|---|---|---|---|---|---|---|---|---|---|---|
| AMNi-3 | 18.89% | 0.912 | 7.47 | 8.71 | 29.27 | 0.34% | 1050 | 1091 | 0.03 | 3.09 |
| AMNi-27 | 19.07% | 0.912 | 8.17 | 8.71 | 39.49 | 0.34% | 1053 | 1099 | 0.03 | 3.09 |
| AMNi-28 | 19.09% | 0.911 | 8.53 | 8.71 | 49.71 | 0.34% | 1054 | 1100 | 0.03 | 3.09 |
| AMNi-29 | 19.10% | 0.910 | 8.88 | 8.71 | 59.93 | 0.34% | 1054 | 1101 | 0.03 | 3.09 |
| AMNi-30 | 19.12% | 0.909 | 9.24 | 8.71 | 70.15 | 0.34% | 1055 | 1102 | 0.03 | 3.09 |
| AMNi-31 | 19.12% | 0.908 | 9.60 | 8.71 | 80.37 | 0.35% | 1056 | 1103 | 0.03 | 3.09 |
| AMNi-32 | 19.13% | 0.907 | 9.96 | 8.71 | 90.60 | 0.35% | 1056 | 1103 | 0.03 | 3.09 |
| AMNi-33 | 19.14% | 0.906 | 10.32 | 8.71 | 100.82 | 0.35% | 1057 | 1104 | 0.03 | 3.09 |
| AMNi-34 | 19.14% | 0.905 | 10.68 | 8.71 | 111.04 | 0.35% | 1057 | 1105 | 0.03 | 3.09 |
| AMNi-35 | 19.14% | 0.904 | 11.04 | 8.71 | 121.26 | 0.35% | 1058 | 1105 | 0.03 | 3.09 |
| AMNi-36 | 19.14% | 0.903 | 11.39 | 8.71 | 131.48 | 0.35% | 1058 | 1106 | 0.03 | 3.09 |
| AMNi-37 | 19.07% | 0.912 | 8.44 | 8.70 | 43.37 | 0.32% | 1053 | 1099 | 0.03 | 3.09 |
| AMNi-38 | 19.08% | 0.912 | 9.07 | 8.70 | 57.48 | 0.30% | 1054 | 1100 | 0.03 | 3.09 |
| AMNi-39 | 19.09% | 0.912 | 9.71 | 8.70 | 71.59 | 0.28% | 1055 | 1101 | 0.03 | 3.09 |
| AMNi-40 | 19.09% | 0.911 | 10.34 | 8.69 | 85.69 | 0.26% | 1055 | 1102 | 0.03 | 3.09 |
| AMNi-41 | 19.09% | 0.911 | 10.98 | 8.69 | 99.80 | 0.24% | 1056 | 1102 | 0.03 | 3.09 |
| AMNi-42 | 19.09% | 0.911 | 11.62 | 8.69 | 113.91 | 0.22% | 1057 | 1102 | 0.03 | 3.09 |
| AMNi-43 | 19.08% | 0.910 | 12.26 | 8.68 | 128.01 | 0.20% | 1057 | 1102 | 0.03 | 3.09 |
| AMNi-44 | 19.06% | 0.910 | 12.89 | 8.68 | 142.12 | 0.18% | 1058 | 1102 | 0.03 | 3.09 |
| AMNi-45 | 19.04% | 0.910 | 13.53 | 8.67 | 156.23 | 0.16% | 1058 | 1102 | 0.03 | 3.09 |
| AMNi-46 | 19.01% | 0.910 | 14.17 | 8.67 | 170.33 | 0.14% | 1059 | 1102 | 0.03 | 3.09 |

Table 12 describes example compositions where the rhenium and ruthenium have been substituted for tungsten in Alloy AMNi-3 between 0.46 to 4.6 wt. % and 0.79 and 7.9 wt. % respectively. The calculated properties for these alloys—demonstrating the effect of substituting rhenium and ruthenium for tungsten—are listed in Table 13.

In comparison to the baseline alloy AMNi-3 it is seen that substitution of rhenium for tungsten content (AMNi-27-AMNi-36) will have a substantial effect on creep resistance (in terms of creep merit index). Creep resistance is also improved by 30° C., in comparison to AMNi-3 when rhenium content is at 4.2 wt. % (FIG. 7). This results in an alloy with a creep temperature of 882° C.; over a 50° C. improvement in comparison to Waspaloy. Although Rhenium is more dense than tungsten by replacing tungsten with rhenium according to ratio $W_W:0.92W_{Re}$ ensures than density is not negatively influenced. The performance improvement gained by substitution of tungsten with rhenium is attained at a substantial increase in cost, thus it is preferable to limit the use of rhenium. The addition of rhenium also has the effect of improving alloy stability (in terms of a lower Md number).

In comparison to the baseline alloy AMNi-3 it is seen that substitution of ruthenium for tungsten content (AMNi-37-AMNi-46) will substantially improve creep resistance (in terms of creep merit index). Creep resistance is also improved by 50° C., in comparison to AMNi-3 when ruthenium content is at 7.9 wt. % (FIG. 7). This results in an alloy with a creep temperature of 903° C.; over a 75° C. improvement in comparison to Waspaloy. Ruthenium is less dense than tungsten, by replacing tungsten with ruthenium according to ratio $W_W:1.58W_{Ru}$ the density of the alloy is maintained. There advantage of substituting tungsten for ruthenium in ratios below $W_W:1.58W_{Ru}$ as this will provide both an improvement in creep resistance and density. The performance improvement gained by substitution of tungsten with ruthenium is attained at a substantial increase in cost, thus it is preferable to limit the use of ruthenium.

TABLE 14

Example compositions where the nickel content has been directly substituted by weight percent with iron between 1.0 to 6.0 wt. % in example alloy AMNi-3.

| Alloy (wt. %) | Ni | Al | Co | Cr | Mo | Nb | Ta | Ti | W | Re | Re | Fe | C | B | Zr |
|---|---|---|---|---|---|---|---|---|---|---|---|---|---|---|---|
| AMNi-3  | 50.50 | 1.50 | 18.00 | 19.50 | 2.00 | 0.50 | 0.50 | 2.50 | 5.00 | 0.00 | 0.00 | 0.00 | 0.100 | 0.010 | 0.001 |
| AMNi-47 | 50.50 | 1.50 | 18.00 | 19.50 | 2.00 | 0.50 | 0.50 | 2.50 | 5.00 | 0.00 | 0.00 | 0.00 | 0.100 | 0.010 | 0.001 |
| AMNi-48 | 49.50 | 1.50 | 18.00 | 19.50 | 2.00 | 0.50 | 0.50 | 2.50 | 5.00 | 0.00 | 0.00 | 1.00 | 0.100 | 0.010 | 0.001 |
| AMNi-49 | 48.50 | 1.50 | 18.00 | 19.50 | 2.00 | 0.50 | 0.50 | 2.50 | 5.00 | 0.00 | 0.00 | 2.00 | 0.100 | 0.010 | 0.001 |
| AMNi-50 | 47.50 | 1.50 | 18.00 | 19.50 | 2.00 | 0.50 | 0.50 | 2.50 | 5.00 | 0.00 | 0.00 | 3.00 | 0.100 | 0.010 | 0.001 |
| AMNi-51 | 46.50 | 1.50 | 18.00 | 19.50 | 2.00 | 0.50 | 0.50 | 2.50 | 5.00 | 0.00 | 0.00 | 4.00 | 0.100 | 0.010 | 0.001 |
| AMNi-52 | 45.50 | 1.50 | 18.00 | 19.50 | 2.00 | 0.50 | 0.50 | 2.50 | 5.00 | 0.00 | 0.00 | 5.00 | 0.100 | 0.010 | 0.001 |
| AMNi-53 | 44.50 | 1.50 | 18.00 | 19.50 | 2.00 | 0.50 | 0.50 | 2.50 | 5.00 | 0.00 | 0.00 | 6.00 | 0.100 | 0.010 | 0.001 |

TABLE 15

Calculated phase fractions and merit indices made with the "Alloys-by-Design" software. Results for compositions where the nickel content has been directly substituted by weight percent with iron between 1.0 to 6.0 wt. % in example alloy AMNi-3 (Table 14).

| Alloy | Phase Fractions γ' | $Md_\gamma$ | Creep Merit Index ($m^{-2}s \times 10^{-15}$) | Density ($g/cm^3$) | Cost (£/g) | γ/γ' Misfit (%) | γ' Solvus (° C.) | Strength Merit Index (Mpa) | AM Index | $W_{Al} + 0.5W_{Ti} + 1.5(0.3W_{Nb} + 0.15W_{Ta})$ |
|---|---|---|---|---|---|---|---|---|---|---|
| AMNi-3  | 18.89% | 0.912 | 7.47 | 8.71 | 29.27 | 0.34% | 1050 | 1091 | 0.03 | 3.09 |
| AMNi-47 | 18.89% | 0.912 | 7.47 | 8.71 | 29.27 | 0.34% | 1050 | 1091 | 0.03 | 3.09 |
| AMNi-48 | 18.95% | 0.913 | 7.46 | 8.70 | 29.08 | 0.30% | 1050 | 1096 | 0.03 | 3.09 |
| AMNi-49 | 18.97% | 0.915 | 7.45 | 8.69 | 28.89 | 0.26% | 1051 | 1101 | 0.03 | 3.09 |
| AMNi-50 | 18.97% | 0.916 | 7.44 | 8.68 | 28.70 | 0.22% | 1051 | 1105 | 0.03 | 3.09 |
| AMNi-51 | 18.94% | 0.917 | 7.43 | 8.67 | 28.51 | 0.17% | 1051 | 1108 | 0.03 | 3.09 |
| AMNi-52 | 18.89% | 0.919 | 7.42 | 8.66 | 28.32 | 0.13% | 1051 | 1110 | 0.03 | 3.09 |
| AMNi-53 | 18.81% | 0.920 | 7.41 | 8.65 | 28.13 | 0.09% | 1051 | 1111 | 0.03 | 3.09 |

Figure 14:
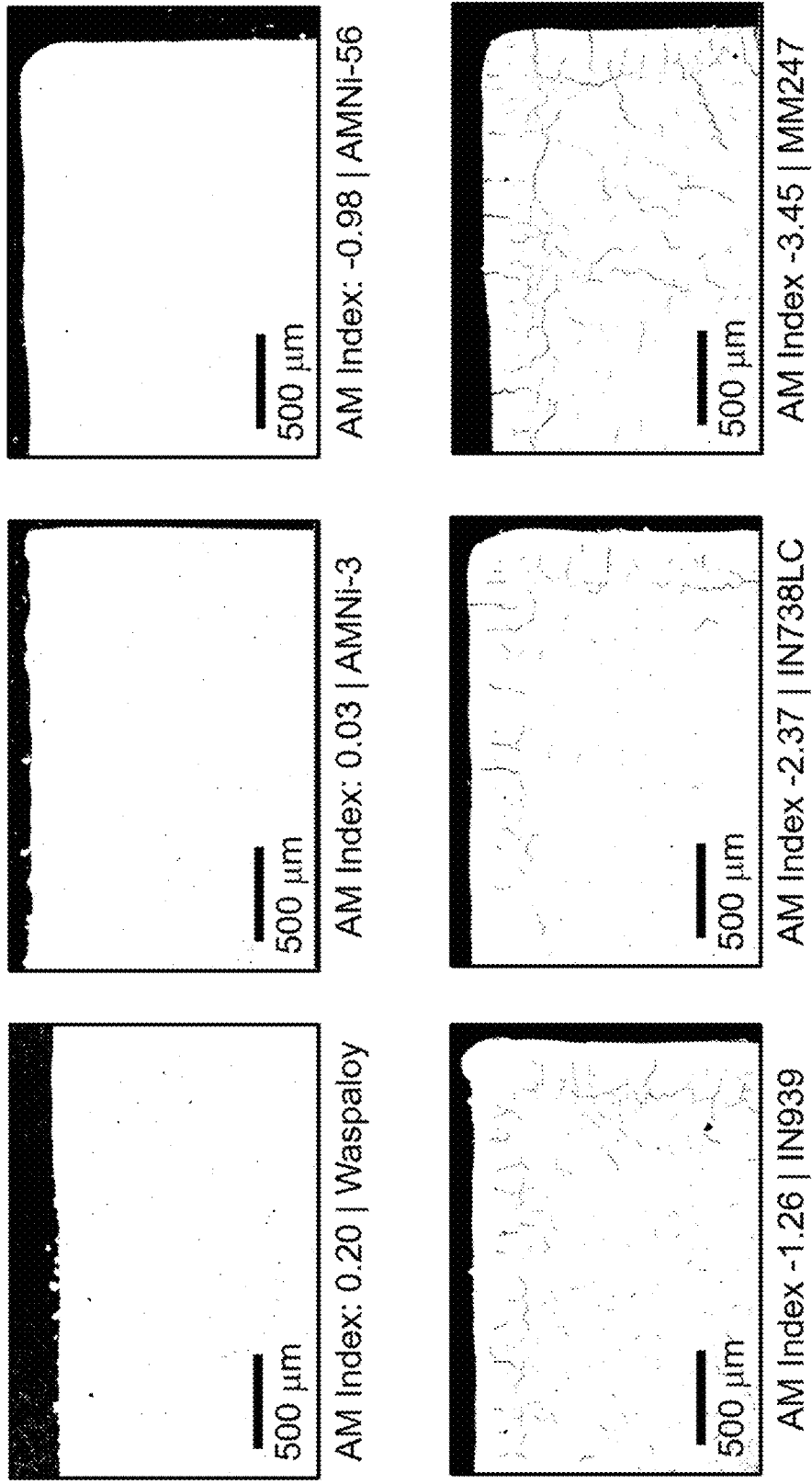
FIG. 14 shows micrographs of nickel-based superalloys manufactured using a powder-bed based AM process. Apparent is the effect of the AM merit index on the susceptibility to cracking during AM processing rationalising the preferred limit for AM merit index ($M_{Additive-Manufacture} \geq -1.0$) within the present invention.

Table 14 describes example compositions where the nickel content in Alloy AMNi-3 has been directly substituted by weight percent with iron between 1.0 to 6.0 wt. % The calculated properties for these alloys—demonstrating the effect of iron—are listed in Table 15. The main benefit of adding iron is that it is a residual element which remains after recycling/remelting of alloy scrap. A higher tolerance to additions of iron will result in an improvement in alloy recyclability. In comparison to the baseline alloy AMNi-3 it is seen that increasing the iron content (AMNi-47-AMNi-53) will reduce alloy microstructural stability (in terms of an increase in Md number). The iron content should be limited to 6.0 wt. % or less to remain below the stability target for the alloy the stability limit (Md≤0.92). There is limited changes in other properties such as γ' volume fraction or tensile strength (in terms of strength merit index) or creep resistance (in terms of creep merit index) due to additions of iron. It is preferable that the alloy contains less than 2 wt. % iron, as this provide a better balance of microstructural stability and recyclability.

same conditions from argon gas atomised alloy powder (+15-45 μm) processed under argon atmosphere (<0.1% $O_2$). A fixed energy density of 2.2 J/mm$^2$ and a layer thickness of 30 μm was selected to best represent how a machine would operate in a manufacturing situation. Metallographic samples were prepared by sectioning parallel to the build direction revealing the X-Z plane after a final 1 μm diamond polish. FIG. 14 shows typical micrographs from an optical microscope after applying histogram-derived thresholding.

When AM index is lowered, there is significant effect on other properties such as γ'-phase volume fraction or tensile strength (in terms of strength merit index). The result is an improved combination of mechanical strength and ability to process using additive manufacturing in comparison to known alloys such as IN939 (AM index −1.26). It is seen that increasing the AM index (at fixed levels of cobalt, chromium, molybdenum and tungsten) will reduce alloy microstructural stability (in terms of an increase in Md number).

TABLE 16

Example compositions where the sum of the γ'-phase forming elements has been increased according to the relationship $W_{Al} + 0.5W_{Ti} + 0.3W_{Nb} + 0.15W_{Ta}$.

| Alloy (wt. %) | Ni | Al | Co | Cr | Mo | Nb | Ta | Ti | W | Re | Ru | Fe | C | B | Zr |
|---|---|---|---|---|---|---|---|---|---|---|---|---|---|---|---|
| AMNi-3 | 50.50 | 1.50 | 18.00 | 19.50 | 2.00 | 0.50 | 0.50 | 2.50 | 5.00 | 0.00 | 0.00 | 0.00 | 0.100 | 0.010 | 0.001 |
| AMNi-54 | 47.50 | 1.50 | 20.00 | 20.00 | 3.30 | 0.75 | 1.50 | 2.75 | 3.30 | 0.00 | 0.00 | 0.00 | 0.100 | 0.010 | 0.001 |
| AMNi-55 | 47.20 | 1.80 | 20.00 | 20.00 | 3.30 | 2.00 | 1.00 | 2.00 | 3.30 | 0.00 | 0.00 | 0.00 | 0.100 | 0.010 | 0.001 |
| AMNi-56 | 46.40 | 2.10 | 20.00 | 20.00 | 3.30 | 1.75 | 1.50 | 2.25 | 3.30 | 0.00 | 0.00 | 0.00 | 0.100 | 0.010 | 0.001 |

TABLE 17

Calculated phase fractions and merit indices made with the "Alloys-by-Design" software. Results for compositions where the sum of the γ'-phase forming elements has been increased according to the relationship $W_{Al} + 0.5W_{Ti} + 0.3W_{Nb} + 0.15W_{Ta}$ (Table 16).

| Alloy | Phase Fractions γ' | $Md_γ$ | Creep Merit Index ($m^{-2}s × 10^{-15}$) | Density (g/cm$^3$) | Cost (£/g) | γ/γ' Misfit (%) | γ' Solvus (° C.) | Strength Merit Index (Mpa) | AM Index | $W_{Al}$ + $0.5W_{Ti}$ + $1.5(0.3W_{Nb}$ + $0.15W_{Ta})$ |
|---|---|---|---|---|---|---|---|---|---|---|
| AMNi-3 | 18.89% | 0.912 | 7.47 | 8.71 | 29.27 | 0.34% | 1050 | 1091 | 0.03 | 3.09 |
| AMNi-54 | 23.33% | 0.918 | 7.97 | 8.67 | 31.73 | 0.34% | 1070 | 1288 | −0.33 | 3.55 |
| AMNi-55 | 24.17% | 0.921 | 8.16 | 8.66 | 31.58 | 0.31% | 1067 | 1286 | −0.55 | 3.25 |
| AMNi-56 | 29.06% | 0.929 | 8.49 | 8.60 | 31.98 | 0.22% | 1089 | 1385 | −0.98 | 4.35 |

Table 16 describes example compositions where the aluminium, niobium, tantalum and titanium content has been varied at fixed levels of cobalt, chromium, molybdenum and tungsten. The alloy AMNi-3 is shown for comparison. The calculated properties for these alloys—demonstrating the effect on the AM index—are listed in Table 17.

In comparison to the baseline alloy AMNi-3 it is seen that increasing the amount of γ'-phase forming elements (AMNi-54-AMNi-56) will increase the susceptibility to cracking during AM processing (in terms of AM index). However, the target for AM index is still achieved. From FIG. 14 it can be seen that an AM index of −1.00 or more results in no cracking during AM manufacture but that with an AM index of lower than −1.00 cracking occurs during AM manufacture. The samples in FIG. 14 were cubical samples measuring 10 mm×10 mm×10 mm which were fabricated using a selective laser melting powder-bed method to assess the ease of processing by additive manufacture of selected nickel-based superalloys. Samples were manufactured under the

The invention claimed is:

1. A nickel-based alloy composition consisting, in weight percent, of: 1.0 to 3.5% aluminium, 0.0 to less than 3.0% titanium, 0.0 to 6.0% niobium, 0.0 to 4.9% tantalum, 0.0 to 5.4% tungsten, 0.0 to 4.0% molybdenum, 8.9 to 30.0% cobalt, more than 15.0% to 20.6% chromium, 0.02 to 0.35% carbon, 0.001 to 0.2% boron, 0.001 to 0.5% zirconium, 0.0 to 5.0% rhenium, 0.0 to 8.5% ruthenium, 0.0 to 4.6 percent iridium, 0.0 to 0.5% vanadium, 0.0 to 1.0% palladium, 0.0 to 1.0% platinum, 0.0 to 0.5% silicon, 0.0 to 0.1% yttrium, 0.0 to 0.1% lanthanum, 0.0 to 0.1% cerium, 0.0 to 0.003% sulphur, 0.0 to 0.25% manganese, 0.0 to 6.0% iron, 0.0 to 0.5% copper, 0.0 to 0.5% hafnium, the balance being nickel and incidental impurities, wherein the following equations are satisfied in which $W_{Nb}$, $W_{Ta}$, $W_{Ti}$, $W_{Mo}$, $W_{Al}$, $W_{Re}$ and $W_{Ru}$ are the weight percent of niobium, tantalum, titanium, molybdenum, aluminium, rhenium and ruthenium in the alloy respectively $$4.2 \leq (W_W + 0.92 W_{Re} + 1.58 W_{Ru}) + W_{Mo}$$

$$W_{Al} + 0.5 W_{Ti} + 0.3 W_{Nb} + 0.15 W_{Ta} \leq 4.0$$

and $$3.0 \leq W_{Al} + 0.5 W_{Ti} + 1.5(0.3 W_{Nb} + 0.15 W_{Ta}).$$

2. The nickel-based alloy composition of claim 1, wherein the following equation is satisfied in which $W_{Nb}$, $W_{Ta}$, $W_{Ti}$ and $W_{Al}$ are the weight percent of niobium, tantalum, titanium and aluminium in the alloy respectively $$(0.5 W_{Ti} + 0.3 W_{Nb} + 0.15 W_{Ta})/W_{Al} \leq 1.5.$$

3. The nickel-based alloy composition of claim 1, wherein the sum of elements molybdenum and tungsten, in weight percent, is 5.3 to 6.6%.

4. The nickel-based alloy composition of claim 1 consisting of, in weight percent, is 1.0 to 3.0% aluminium.

5. The nickel-based alloy composition of claim 1, consisting of, in weight percent, 0.2 to 4.9 wt. % tungsten.

6. The nickel-based alloy composition of claim 1, consisting of, in weight percent, 1.6 to 4.0 wt. % molybdenum.

7. The nickel-based alloy composition of claim 1, consisting of, in weight percent, 15.6 to 25.0 wt. % cobalt.

8. The nickel-based alloy composition of claim 1, consisting of, in weight percent, 0.001 to 0.01 wt. % zirconium.

9. The nickel-based alloy composition of claim 1, consisting of, in weight percent, 5.1 wt % or less niobium.

10. The nickel-based alloy composition of claim 1, having a microstructure with a volume fraction of γ' of 0.18 and 0.30 at 900° C.

11. The nickel-based alloy composition of claim 1, wherein the sum of elements tungsten, rhenium, ruthenium and iridium is less than or equal to 5.4 wt % equivalent of tungsten alone in terms of density.

12. The nickel-based alloy composition of claim 1, consisting of, in weight percent, 3.0 wt % or less rhenium and/or ruthenium and/or iridium.

13. The nickel-based alloy composition according to claim 1, wherein the following equation is satisfied in $$W_{Al} + 0.5 W_{Ti} + 0.3 W_{Nb} + 0.15 W_{Ta} \leq 4.0.$$

14. The nickel based alloy composition according to claim 1, consisting of, in weight percent, 3.8 wt. % or less molybdenum.

15. The nickel based alloy composition according to claim 1, consisting of, in weight percent, 0.1 wt. % to 4.9 wt. % of tantalum.

16. The nickel based alloy composition according to claim 1, consisting of, in weight percent, 0.1 wt. % to 6.0 wt. % niobium.

17. The nickel based alloy composition according to claim 1, consisting of, in weight percent, 0.1 wt. % to less than 3.0 wt. % titanium.

18. The nickel based alloy composition according to claim 1, consisting of, in weight percent, 0.2 wt. % to 5.4 wt. % tungsten.

19. The nickel based alloy composition according to claim 1, consisting of, in weight percent, of more than 15.0 wt. % to 20.6 wt. % chromium and $W_{Mo} + W_W$ less than 6.6 wt. %.

* * * * *

UNITED STATES PATENT AND TRADEMARK OFFICE
CERTIFICATE OF CORRECTION

PATENT NO. : 12,258,655 B2
APPLICATION NO. : 18/117828
DATED : March 25, 2025
INVENTOR(S) : David Crudden and Andre Nemeth Page 1 of 1

It is certified that error appears in the above-identified patent and that said Letters Patent is hereby corrected as shown below:

In the Claims

In Claim 1, Column 31, Line 3, please delete "$W_{Al} + 0.5W_{Ti} + 0.3W_{Nb} + 0.15W_{Ta} \leq 4.0$" after --$4.2 \leq (W_W + 0.92\ W_{Re} + 1.58\ W_{Ru}) + W_{Mo}$--.

Signed and Sealed this
Twenty-ninth Day of April, 2025

Coke Morgan Stewart
*Acting Director of the United States Patent and Trademark Office*